United States Patent
He et al.

(10) Patent No.: US 12,486,299 B2
(45) Date of Patent: Dec. 2, 2025

(54) METHOD FOR PREPARING N-ACETYL-D-GALACTOSAMINE TRIPOLYMER PRECURSOR

(71) Applicant: West China Hospital, Sichuan University, Sichuan (CN)

(72) Inventors: Zhiyao He, Sichuan (CN); Yuquan Wei, Sichuan (CN)

(73) Assignee: West China Hospital, Sichuan University, Chengdu (CN)

( * ) Notice: Subject to any disclaimer, the term of this patent is extended or adjusted under 35 U.S.C. 154(b) by 426 days.

(21) Appl. No.: 18/335,136

(22) Filed: Jun. 15, 2023

(65) Prior Publication Data

US 2023/0416290 A1    Dec. 28, 2023

(30) Foreign Application Priority Data

Jun. 24, 2022   (CN) .......................... 202210724661.3

(51) Int. Cl.
| | |
|---|---|
| C07H 15/10 | (2006.01) |
| C07C 269/06 | (2006.01) |
| C07H 15/04 | (2006.01) |
| C07H 15/18 | (2006.01) |
| C08B 37/00 | (2006.01) |

(52) U.S. Cl.
CPC ............ *C07H 15/18* (2013.01); *C07C 269/06* (2013.01); *C07H 15/04* (2013.01); *C07H 15/10* (2013.01); *C08B 37/0087* (2013.01)

(58) Field of Classification Search
None
See application file for complete search history.

(56) References Cited

U.S. PATENT DOCUMENTS

2022/0186221 A1*   6/2022   Zhang ................ A61K 31/7115

\* cited by examiner

*Primary Examiner* — Traviss C Mcintosh, III

(57) ABSTRACT

Disclosed is a method for preparing an N-acetyl-D-galactosamine tripolymer precursor. In the preparation of the tripolymer precursor, a compound 4 is prepared by the following steps: adding a compound 3, a 4 Å molecular sieve powder, and a reaction solvent into a reactor; inflating and changing protective gas for 3 times; stirring; firstly adding an enol, followed by slowly dropping trimethylsilyl trifluoromethanesulfonate; after a reaction, quenching the reaction with an alkali solution; and performing extraction, separating liquid, washing, drying, filtration, etc., so as to obtain the compound 4. According to the present disclosure, the problems of various production processes, more times of column chromatography for purification of products accompanied by lower yields in the prior art are solved.

12 Claims, No Drawings

METHOD FOR PREPARING N-ACETYL-D-GALACTOSAMINE TRIPOLYMER PRECURSOR

TECHNICAL FIELD

The present disclosure belongs to a pharmaceutical and chemical field, and specifically relates to a method for preparing an N-acetyl-D-galactosamine tripolymer precursor.

BACKGROUND TECHNOLOGY

Asialoglycoprotein receptors are mainly expressed on surfaces of liver parenchymal cells, and have a high affinity for N-acetyl-D-galactosamine, especially N-acetyl-D-galactosamine (GalNAc) tripolymer precursors. Target substances are coupled to the N-acetyl-D-galactosamine tripolymer, so that the target substances can be delivered to targeted livers to achieve purposes of preventing, diagnosing or treating related diseases.

In 2012, Alnylam has successfully developed a GalNAc conjugated ribonucleic acid (RNA) delivery technology and applied for a patent (EP2880162B1). As a ligand, the GalNAc can accurately target liver cells, and an rate of the RNA escaping from endocytosis vesicles is also greatly improved, so that a dosage of drugs is reduced, and safety and effectiveness of the drug are remarkably improved. Meanwhile, after a single dose of administration, the therapy effect can last for a long time, and this is a huge advantage of the GalNAc. In addition, some GalNAc conjugated drugs have been approved for marketing in recent years. For instance, in November, 2019, Givosiran has been approved by the Food and Drug Administration (FDA) of the United States to treat acute hepatic porphyria diseases for adults; in November, 2020, lumasiran has been approved in the United States to treat primary hyperoxaluria type 1 for adults and pediatric patients; and in December, 2020, Inclisiran has been approved by the European Union as adjuvant means of diet control for treating adult primary hypercholesterolemia (heterozygous familial and non-familial) or mixed dyslipidemia. In addition to coupling with siRNA, the GalNAc can also be coupled with ASO, saRNA, miRNA, small molecule chemotherapy drugs, and the like, and it can be found therefrom that the GalNAc has a huge application potential in the aspect of liver targeted delivery.

As a ligand of a delivery technology, synthesis of the GalNAc has been a very complicated process in which column chromatography is required to be performed more times, but the yields are low. A synthetic route of the ligand is initially proposed by Thazha et al. in a patent WO2014179620A1 in which the synthetic route is not described in detail, and column chromatography is performed on compounds for more times. Moreover, a preparative liquid phase is used as a purification method for a final product, causing a very high production cost. In a series of following patents (WO2014205451A2, WO2015042447A1, WO2015168589A2, WO2015168618A3, WO2015168635A3, WO2015188194A1, WO2015200078A1, WO2016011123A1 and WO2019053661A2), only structures of the GalNAc are optimized, but the production process thereof is not further developed and updated.

SUMMARY OF THE DISCLOSURE

An objective of the present disclosure is to provide a method for preparing an N-acetyl-D-galactosamine tripolymer precursor to solve the problems of various production processes, and more times of column chromatography of products accompanied by lower yields in the prior art. According to the present disclosure, a production process of the GalNAc is further developed and updated.

In order to realize the above objective, a method for preparing an N-acetyl-D-galactosamine tripolymer precursor includes:

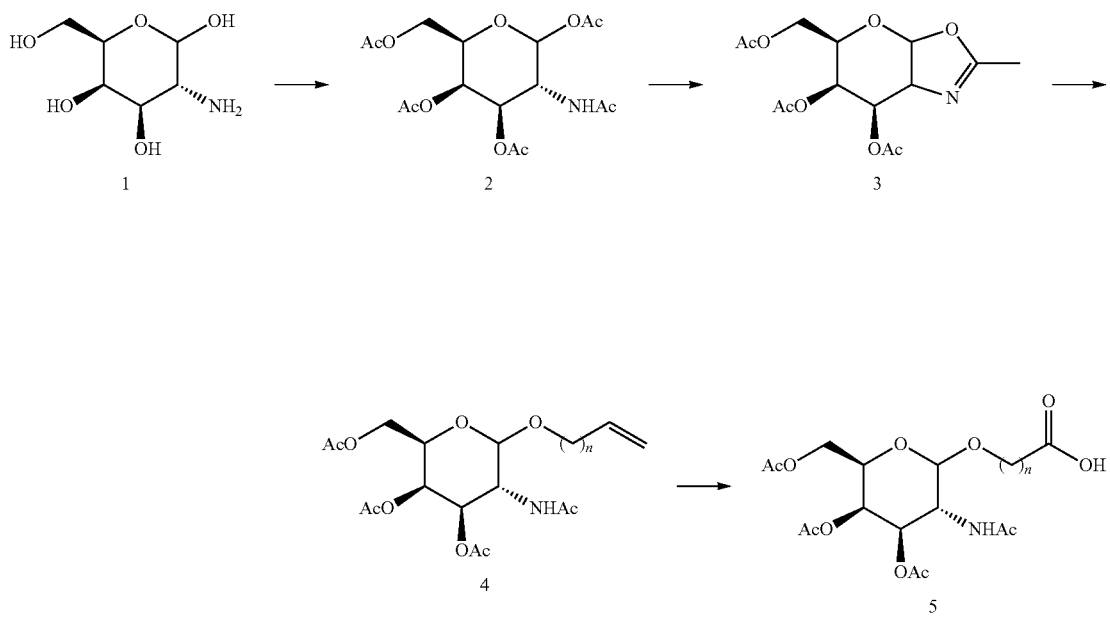

-continued
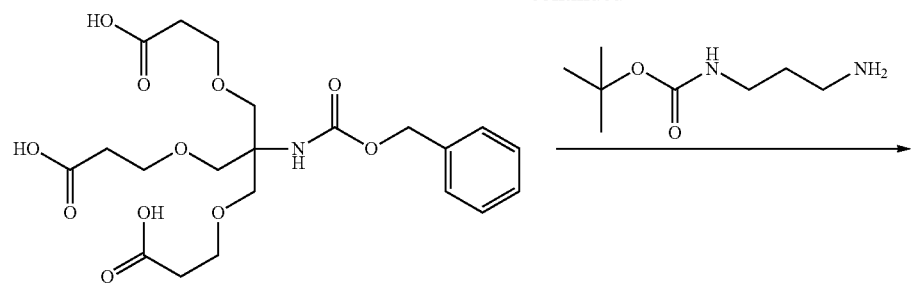
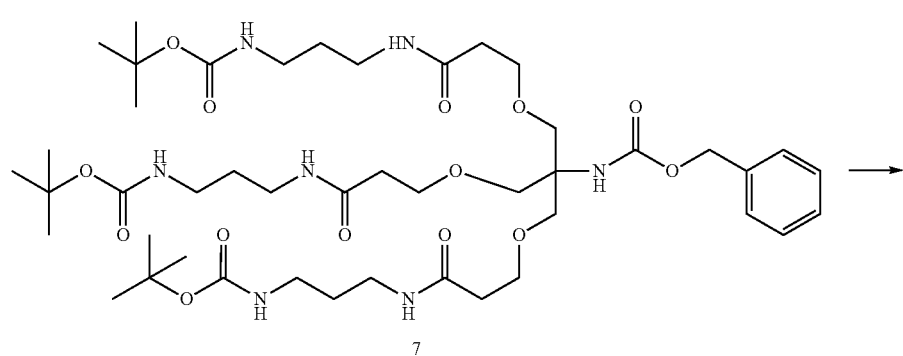
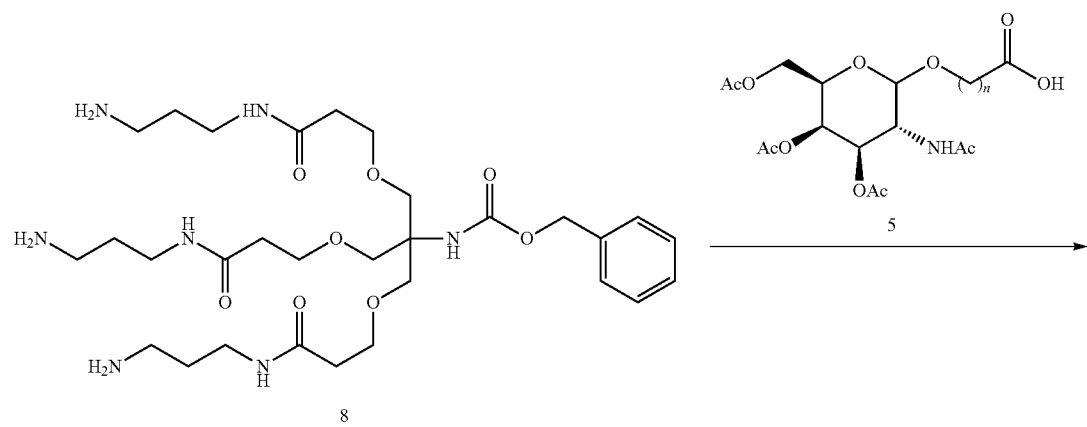
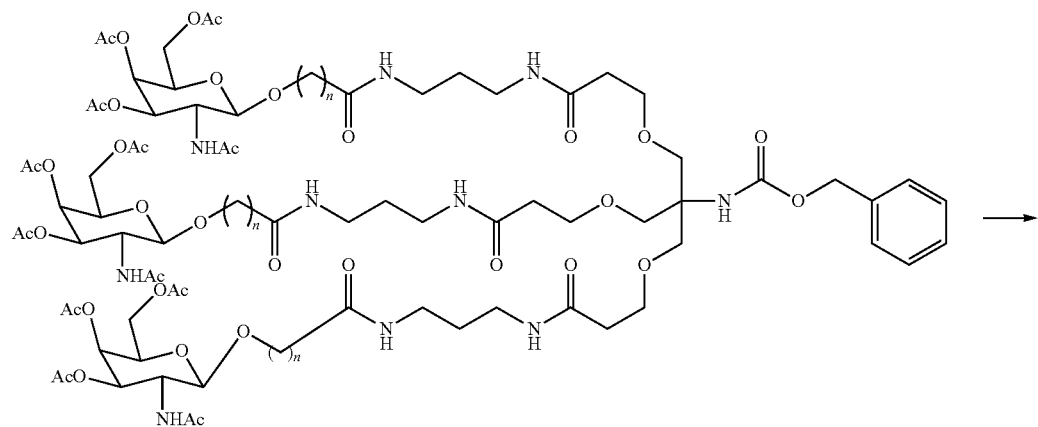

-continued
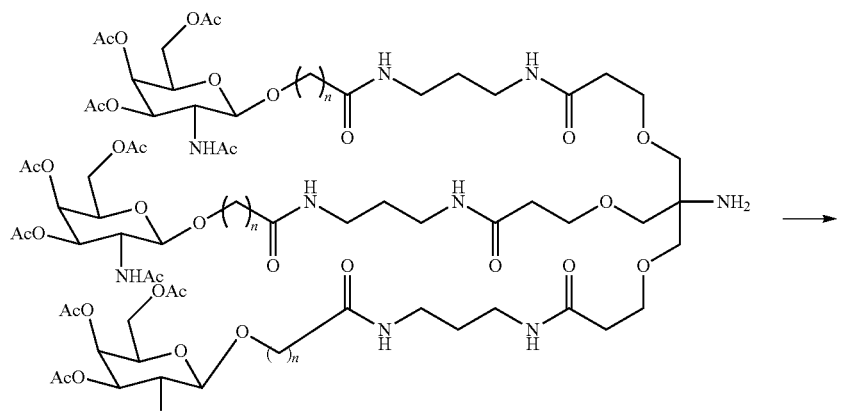
10
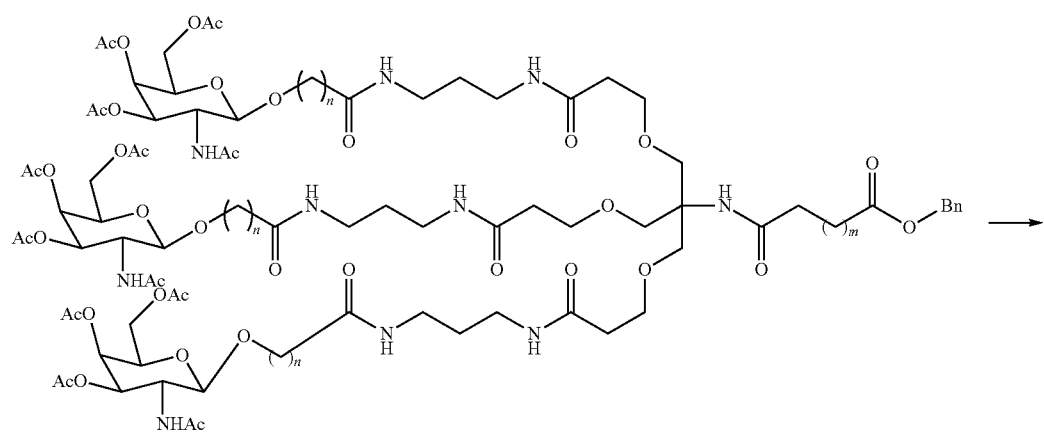
11
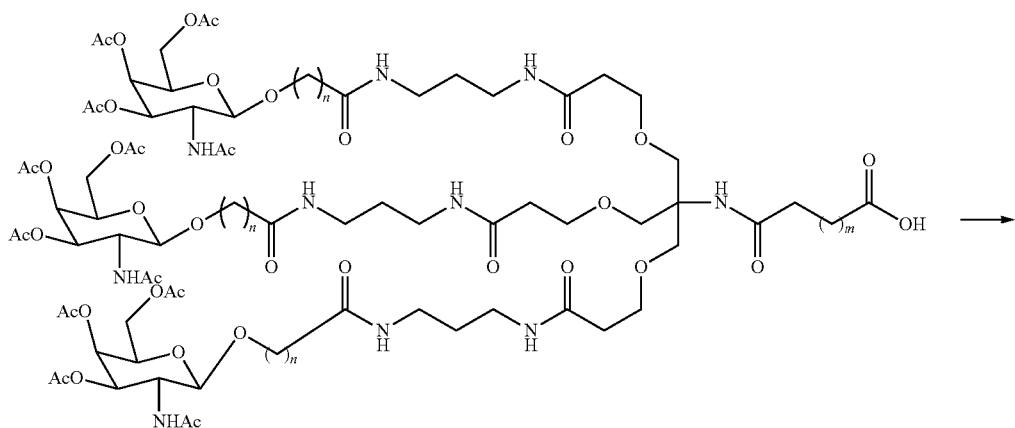
12

-continued

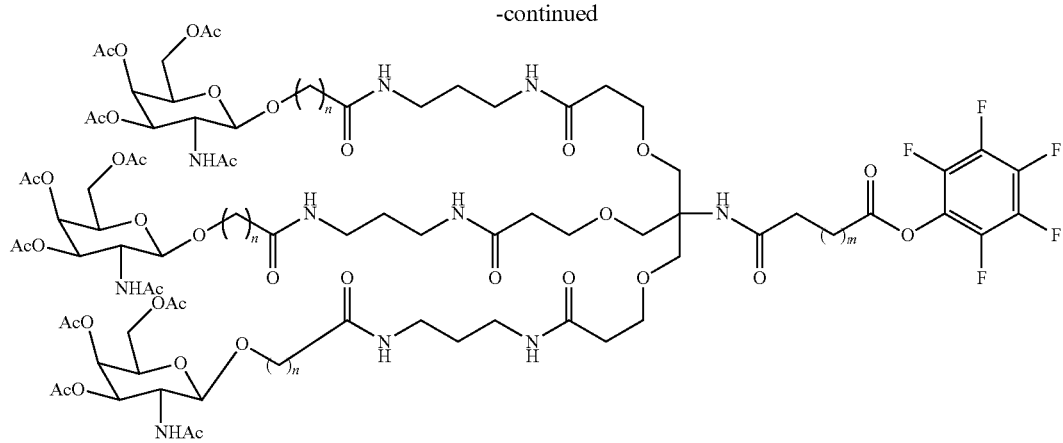

13

In the above formulas, n represents an integer ranging from 2 to 6, and m represents an integer ranging from 1 to 20.

A method for preparing a compound 4 includes: adding a compound 3, a 4 Å molecular sieve powder, and a reaction solvent into a reactor at a room temperature; performing stirring at an inert gas atmosphere; firstly, adding an enol, followed by slowly dropping trimethylsilyl trifluoromethanesulfonate; after a reaction, quenching the reaction with an alkali solution; filtrating to remove the 4 Å molecular sieve powder, washing an organic phase with saturated salt solution for three times, removing the solvent in vacuo; performing recrystallization with a non-polar organic solvent; and performing filtration with suction to obtain a filter cake, that is, the compound 4.

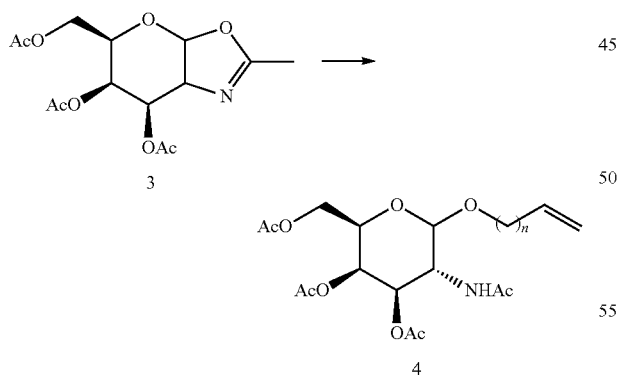

In the above method, the reaction solvent is selected from any one of dichloromethane, 1,2-dichloroethane, trichloromethane, and tetrachloromethane; the inert gas is selected from either nitrogen gas or argon gas; the alkali solution is selected from any one of sodium bicarbonate, sodium carbonate, potassium bicarbonate, potassium carbonate, sodium methoxide, and sodium ethoxide; and the non-polar organic solvent is selected from any one or more of n-pentane, n-hexane, cyclohexane, cyclopentane, petroleum ether, n-heptane, and tetrahydrofuran.

A method for preparing a compound 5 includes: adding the compound 4 and the organic solvent into a reactor at the room temperature, followed by stirring; slowly adding a NaIO$_4$ solution, followed by stirring; adding RuCl$_2$, followed by stirring; and evaporating under reduced pressure to obtain the compound 5.

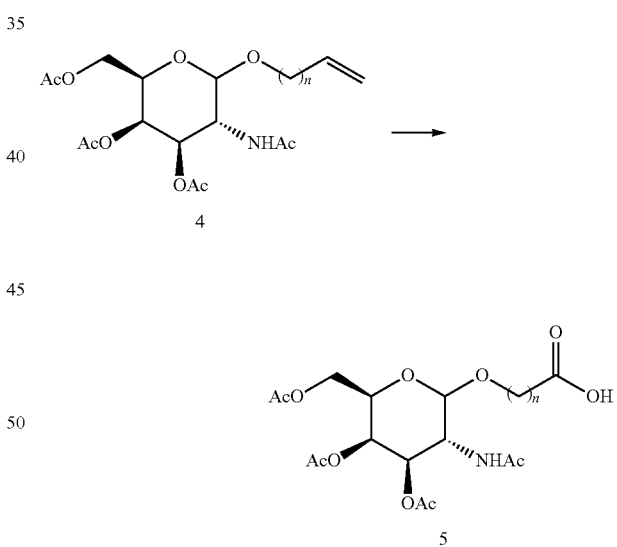

A method for preparing a compound 11 includes: adding a monobenzyl alkanedioate into dimethylformamide at the room temperature; adding O-benzotriazole-tetramethyluronium hexafluophosphate and N,N-diisopropylethylamine in sequence, followed by stirring; adding a compound 10, followed by stirring; removing dimethylformamide in vacuo; dissolving a residue in dichloromethane; washing the organic phase; performing drying with sodium sulfate, followed by filtration and evaporating under reduced pressure; and purifying the crude product by silica gel column chromatography to obtain the compound 11.

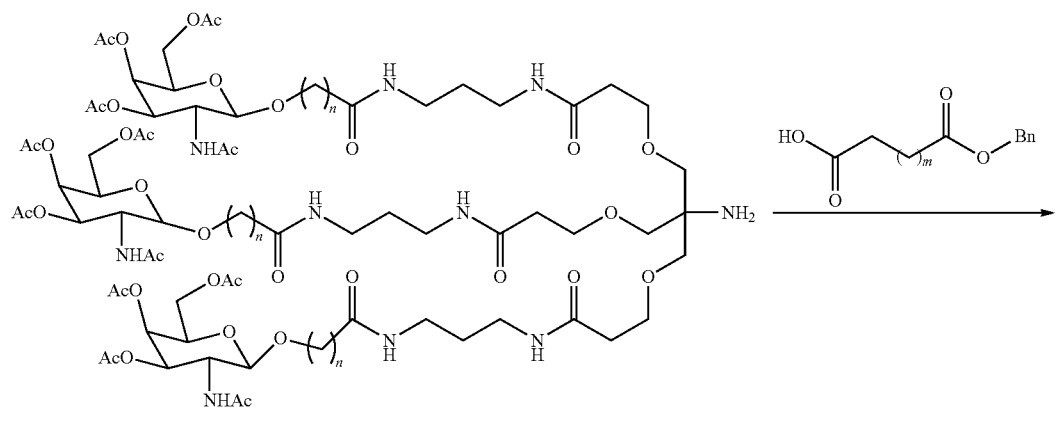
10
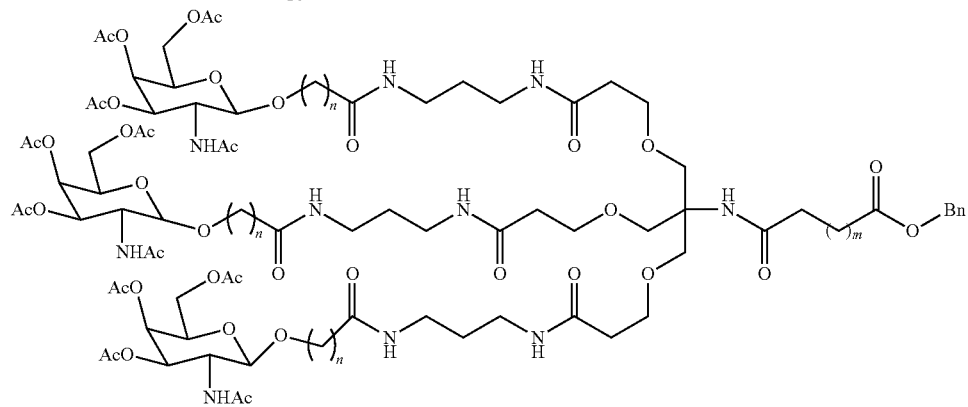
11
A method for preparing a compound 12 includes: dissolving the compound 11 in a reaction solvent at the room temperature; adding a palladium-carbon, followed by stirring in a hydrogen atmosphere; and performing post-treatment to obtain the compound 12.
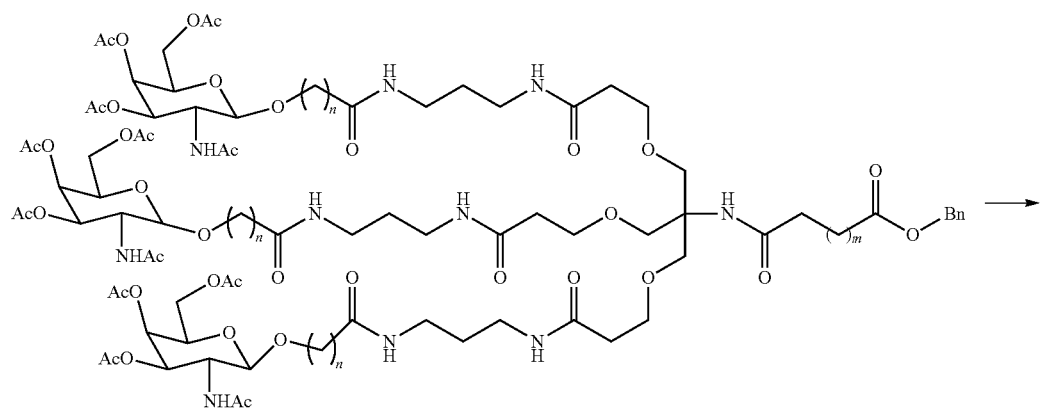
11

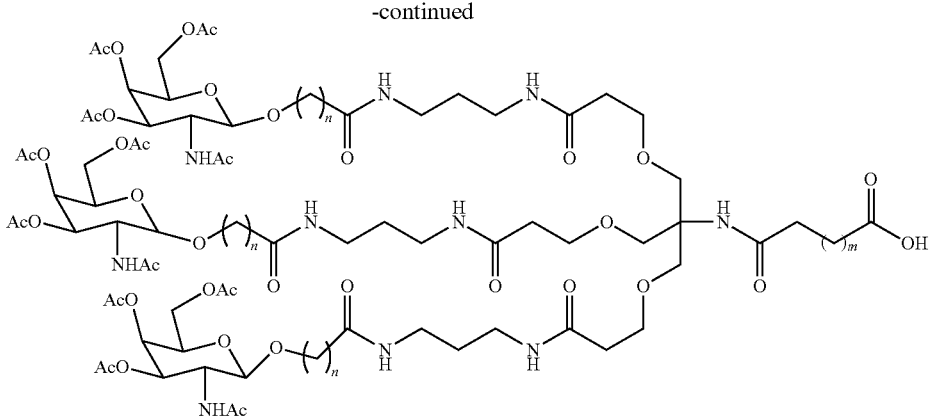

12

In the above method, the reaction solvent is methanol. Preferably, n represents 4, and m represents 9.

A method for preparing a compound 3 includes: adding and dissolving a compound 2 into a reaction solvent at the room temperature, followed by stirring; adding trimethylsilyl trifluoromethanesulfonate, followed by heating to 40-65 DEG C. and stirring; then quenching the reaction by adding an alkali; and performing drying, filtration and evaporating an extracted organic phase under reduced pressure to obtain the compound 3.

In the above method, the reaction solvent is selected from any one of dichloromethane, 1,2-dichloroethane, trichloromethane, and tetrachloromethane; and the alkali in the quenching of the reaction by adding an alkali is selected from any one of diaminopropane, trimethylamine, triethylamine, tripropylamine, triisopropylamine, tributylamine, triisobutylamine, tri-sec-butylamine, tri-n-pentylamine, methoxyethylamine, and ethoxyethylamine.

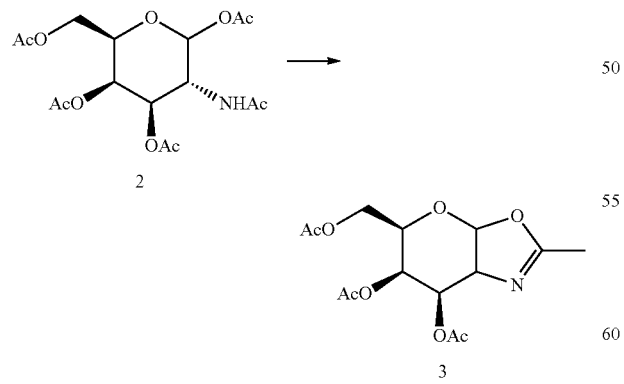

A method for preparing the compound 2 includes: adding a compound 1 into a solvent at the room temperature, followed by stirring; adding an acetylating agent and a deacid reagent, followed by stirring; removing the reaction solution in vacuo; and then adding a recrystallization solvent, followed by filtration and drying, to obtain the compound 2.

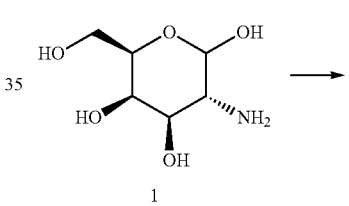

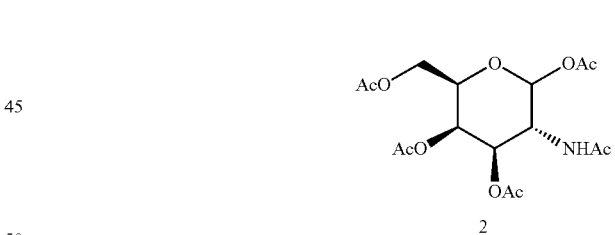

In the above method, the acetylating agent is acetic anhydride; the deacid reagent is selected from any one of sodium acetate, triethylamine, and isopropylamine; and the recrystallization solvent is selected from any one of a $C_1$-$C_{10}$ alcohol and a mixed liquid of various $C_1$-$C_{10}$ alcohols.

A method for preparing a compound 9 includes: dissolving a compound 8 and a compound 5 in a reaction solvent at the room temperature, followed by stirring; adding N-methylimidazole and N,N,N',N'-tetramethylchlofmainiumhexafluophosphate, followed by stirring in a sealed condition; adding dichloromethane after the reaction; performing washing with saturated salt solution; performing drying with anhydrous sodium sulfate, filtration, and evaporating under reduced pressure under reduced pressure; and purifying the crude product by silica gel column chromatography for to obtain the compound 9.

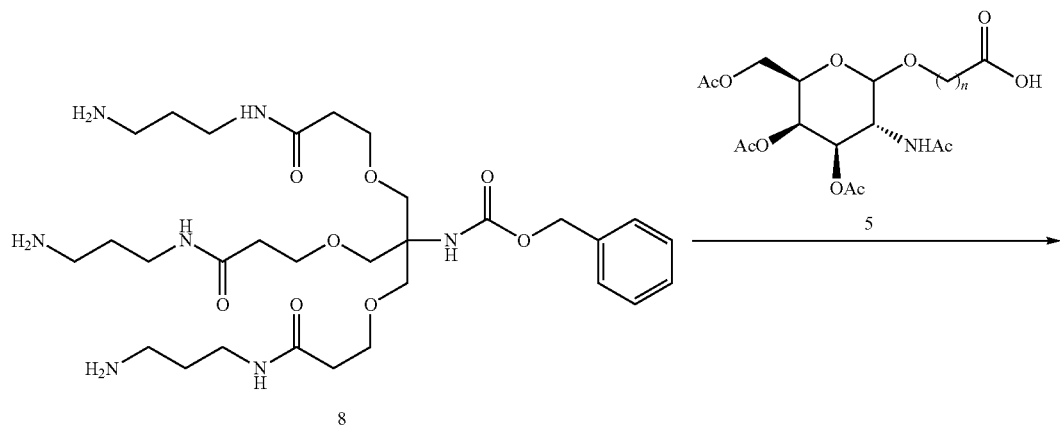

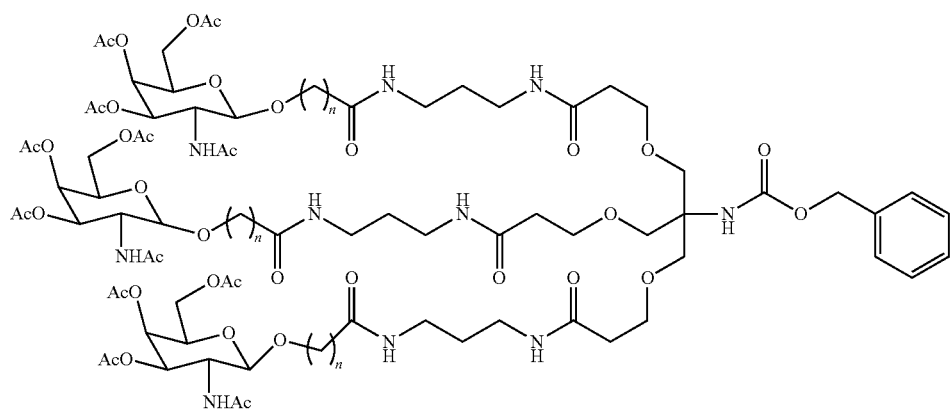

A method for preparing a compound 7 includes: dissolving a compound 6 in a reaction solvent in an inert gas atmosphere at the room temperature, followed by stirring; adding N-(tert-butyloxycarbonyl)-1,3-diaminopropane; reducing the reaction temperature to 0 DEG C.; adding 1-hydroxybenzotriazole and O-benzotriazole-tetramethyl-urea hexafluorophosphate during stirring, followed by adding N,N-diisopropylethylamine dropwise; slowly raising the reaction temperature to the room temperature and continuing to stir overnight; adding water, extracting and separating the organic phase with the organic solvent; washing the organic phase with an inorganic alkali saturated solution, water, an acid aqueous solution, water and saturated salt solution in sequence; and performing drying with the anhydrous sodium sulfate, followed by filtration and evaporating under reduced pressure to obtain the compound 7.

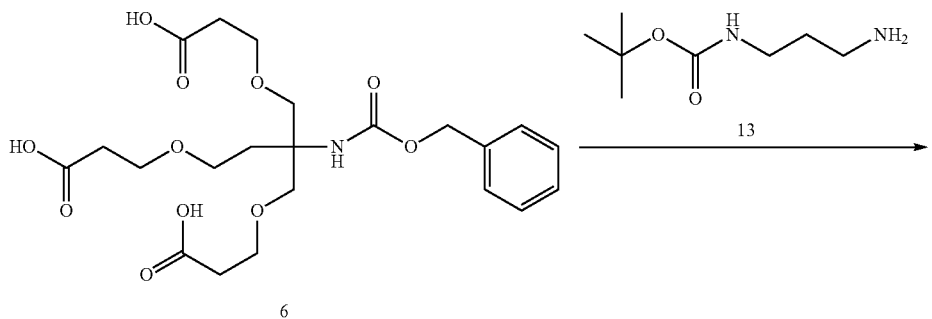

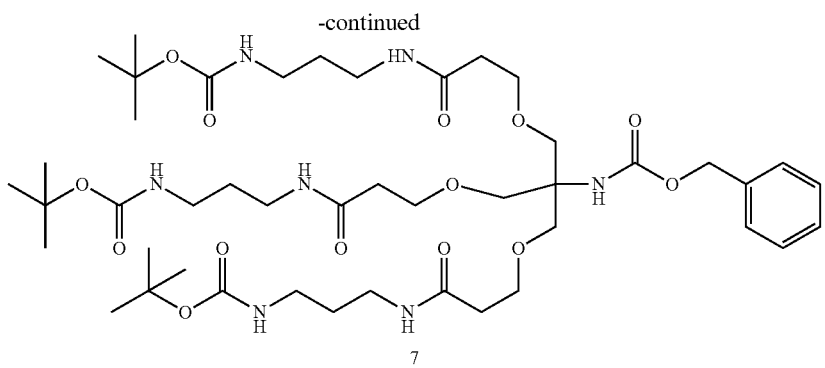

7

In the above method, the inert gas is selected from either nitrogen gas or argon gas; the reaction solvent is selected from any one or more of ethyl ether, diisopropyl ether, tetrahydrofuran, 1,4-dioxane, and 1,2-dimethoxyethane; and the inorganic alkali is selected from any one of sodium carbonate, potassium carbonate, sodium bicarbonate, trisodium phosphate, disodium hydrogen phosphate, potassium carbonate, potassium bicarbonate, tripotassium orthophosphate, and potassium hydrogen phosphate.

The present disclosure further provides a preparation method of a compound 4 for preparing an N-acetyl-D-galactosamine tripolymer precursor, and the method includes: adding the compound 3, a 4 Å molecular sieve powder, and a reaction solvent into a reactor at a room temperature; performing stirring at an inert gas atmosphere; firstly adding an enol, followed by slowly dropping trimethylsilyl trifluoromethanesulfonate; after a reaction, quenching the reaction with an alkali solution; performing extraction with an organic solvent; extracting with the organic solvent to obtain an organic phase; removing the solvent in vacuo; performing recrystallization with a non-polar organic solvent; and performing filtration with suction to obtain a filter cake, that is, the compound 4.

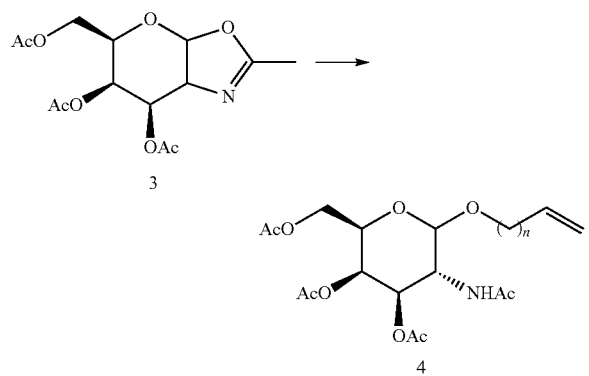

In the above preparation method, n represents 4; the reaction solvent is selected from any one of dichloromethane, 1,2-dichloroethane, trichloromethane, and tetrachloromethane; the inert gas is selected from either nitrogen gas or argon gas; the alkali solution is selected from any one of sodium bicarbonate, sodium carbonate, potassium bicarbonate, potassium carbonate, sodium methoxide, and sodium ethoxide; and the non-polar organic solvent is selected from any one or more of n-pentane, n-hexane, cyclohexane, cyclopentane, petroleum ether, heptane, and tetrahydrofuran.

The present disclosure yet provides a preparation method of the compound 5 for preparing an N-acetyl-D-galactosamine tripolymer precursor, and the method includes: adding the compound 4 and an organic solvent into a reactor at the room temperature, followed by stirring; slowly adding a NaIO$_4$ solution, followed by stirring; adding RuCl$_2$, followed by stirring; and removing solvent in vacuo to obtain the compound 5.

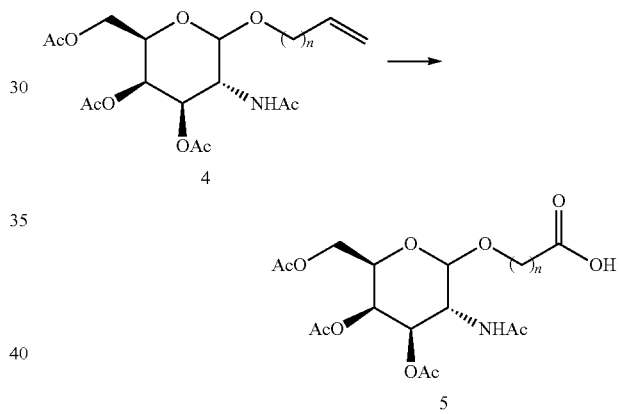

In the above formulas, n represents 4.

A method for preparing an N-acetyl-D-galactosamine tripolymer precursor of the present disclosure solves the problems of various production processes, more times of column chromatography of products accompanied by lower yields in the prior art, and the preparation method has the following advantages.

1. According to the present disclosure, the compound 5 is prepared from galactosamine through four steps without performing column chromatography and with a shorter synthetic route and higher yields than the prior art.

2. According to the present disclosure, a method for preparing a precursor is optimized, especially synthesis of the compound 9, in which a new condensing agent, instead of HBTU, is used in an acid amine condensation, so that the yield is improved obviously.

3. According to the present disclosure, the N-acetyl-D-galactosamine tripolymer precursor can couple with substances having effects of preventing, diagnosing, or treating diseases, and the target substance can be delivered to targeted livers to play corresponding roles.

4. According to the present disclosure, a production process of the N-acetyl-D-galactosamine tripolymer precursor is further developed and updated, which reduces production cost and has a wide application prospect.

SPECIFIC EMBODIMENTS

The technical solutions of the present disclosure will be described clearly and completely below. Obviously, the examples described are only a part of examples of the present disclosure rather than all examples. Based on the examples of the present disclosure, all other examples obtained by those ordinary skilled in the art without creative efforts fall within the scope of protection of the present disclosure.

Example 1

(1) A method for synthesizing a compound 2 as an intermediate product includes the following steps.

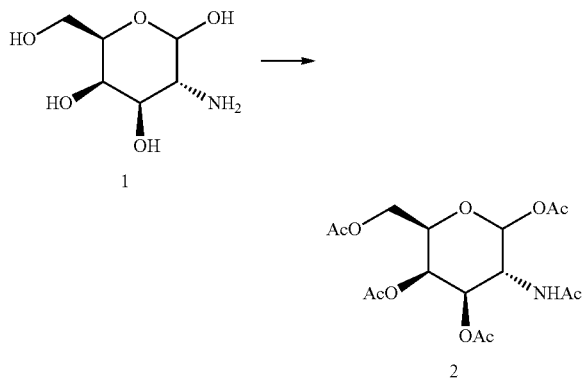

Galactosamine (10.012 g, 46.38 mmol) and dichloromethane (DCM, 100 mL) are added into a reactor in sequence and stirred at a room temperature, then triethylamine (35.13 g, 34.78 mmol) and acetic anhydride (35.48 g, 34.78 mmol) are added into the reactor separately, followed by performing stirring overnight, and thin-layer chromatography (TLC) (DCM:MeOH=5:1) is performed to monitor the reaction.

After the reaction, the reaction solution is evaporated under reduced pressure, followed by adding methanol and performing stirring for 2 h to perform crystallization, then filtration is performed, and a filter cake is washed with a small amount of methanol, thereby obtaining a white solid, that is, the compound 2 (mass: 20.670 g, yield: 95%).

Nuclear magnetic data characterization is as follows:
$^1$H NMR (400 MHz, CDCl$_3$): δ5.70 (d, J=8.7 Hz, 1H), 5.37 (s, 2H), 5.08 (dd, J=11.2, 3.1 Hz, 1H), 4.45 (dd, J=20.0, 9.2 Hz, 1H), 4.14 (ddd, J=25.1, 11.3, 6.7 Hz, 2H), 4.02 (t, J=6.4 Hz, 1H), 2.17 (s, 3H), 2.13 (s, 3H), 2.05 (s, 3H), 2.02 (s, 3H), 1.94 (s, 3H).

(2) A method for synthesizing a compound 3 as an intermediate product includes the following steps.

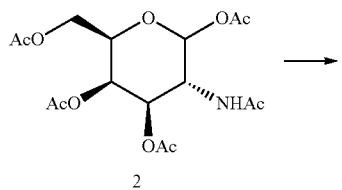

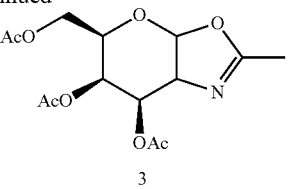

The compound 2 (6.001 g, 15.41 mmol) and 1,2-dichloroethane (60 mL) are added into a reactor in sequence and stirred at the room temperature, then trimethylsilyl trifluoromethanesulfonate (TMSOTf) (3.767 g, 16.95 mmol) are dropped into the reaction solution slowly, after dropping, the temperature is raised to 55 DEG C. and stirring is performed for 1 h, and the TLC (DCM:MeOH=20:1) is performed to monitor the reaction.

After the reaction, the reaction solution is evaporated under reduced pressure to obtain the compound 3 (mass: 5.021 g, yield: 98%).

Nuclear magnetic data characterization is as follows:
$^1$H NMR (400 MHz, CDCl$_3$): δ5.92 (d, J=6.8 Hz, 1H), 5.39 (t, J=3.0 Hz, 1H), 4.84 (dd, J=7.4, 3.3 Hz, 1H), 4.21-4.16 (m, 1H), 4.13 (dd, J=11.1, 6.9 Hz, 1H), 4.04 (dd, J=11.1, 5.8 Hz, 1H), 3.9-3.88 (m, 1H), 2.05 (s, 3H), 2.00 (s, 6H), 1.98 (d, J=0.9 Hz, 3H).

(3) A method for synthesizing a compound 4 as an intermediate product includes the following steps

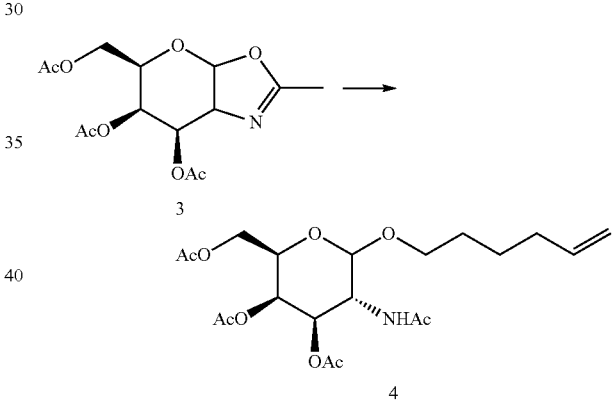

An untreated compound 3 (5.021 g, 15.18 mmol), a 4 Å molecular sieve powder (MS, 5.011 g) and 1,2-dichloroethane (35 mL) are added into a reactor in sequence at the room temperature, followed by inflating and changing nitrogen gas three times and performing stirring for 5 minutes, 5-hexen-1-ol (1.680 g, 16.77 mmol) is added firstly, and then TMSOTf (1.687 g, 7.592 mmol) is dropped into the reactor slowly in 10 minutes, and after dropping, the TLC (DCM:MeOH=20:1) is performed immediately to monitor the reaction.

After the reaction, 20 mL of dichloromethane is added into the reaction solution, followed by quenching the reaction with a small amount of a sodium bicarbonate saturated solution, filtration is performed with diatomite, and an organic phase is separated. The organic phase is washed with saturated salt solution, followed by drying with anhydrous sodium sulfate and filtration, filtrate is evaporated under reduced pressure to obtain an oily matter, and then n-hexane is added, followed by stirring, and crystallization occurs to obtain a solid with faint yellow, that is, the compound 4 (mass: 5.635 g, yield: 86%).

Nuclear magnetic data characterization is as follows:

$^1$H NMR (400 MHz, CDCl$_3$): δ5.78-5.62 (m, 2H), 5.26 (dt, J=11.1, 3.5 Hz, 2H), 5.00-4.83 (m, 2H), 4.65 (d, J=8.4 Hz, 1H), 4.15-4.01 (m, 2H), 3.93-3.77 (m, 3H), 3.43 (dt, J=9.6, 6.8 Hz, 1H), 2.07 (s, 3H), 1.98 (s, 4H), 1.93 (s, 3H), 1.88 (s, 3H), 1.53 (dq, J=12.6, 6.5 Hz, 2H), 1.43-1.29 (m, 2H).

(4) A method for synthesizing a compound 5 as an intermediate product includes the following steps.

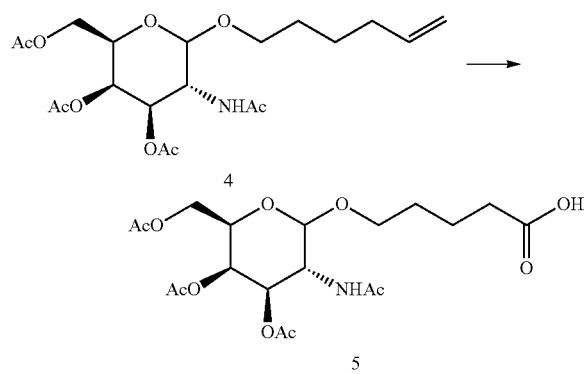

The compound 4 (5.005 g, 11.04 mmol), dichloromethane (15 mL), and acetonitrile (15 mL) are mixed uniformly, and are added into a reactor and stirred at the room temperature, a NaIO$_4$ solution formed by dissolving NaIO$_4$ (9.961 g, 46.57 mmol) in 25 mL of deionized water is slowly added into a reaction solution, followed by stirring for 15 min, RuCl$_2$ (0.04 g, 0.2328 mmol) is added into a reaction solution, followed by stirring for 1 h, and the TLC (DCM:MeOH=10:1) is performed to monitor the reaction.

After the reaction, 20 mL of water is added into a reaction solution, followed by slowly adding a saturated NaHCO$_3$ solution to adjust a pH value of the reaction solution to 7.5, an aqueous phase is washed twice with dichloromethane, and the aqueous phase is retained. Then, a citric acid solution is dropped slowly into the aqueous phase until the pH value is 3, the aqueous phase is extracted twice with dichloromethane, and the organic phase is retained. Finally, the organic phase is washed twice with saturated salt solution, followed by removing the aqueous phase, 3% of NaS solution is added into the organic phase, followed by stirring until the color of the organic phase turn to yellow, and the organic phase is separated, and evaporation is performed under reduced pressure to obtain the compound 5 (mass: 4.276 g, yield: 82%).

Nuclear magnetic data characterization is as follows:

$^1$H NMR (400 MHz, CDCl$_3$): δ5.72 (d, 1H, J=8.5 Hz), 5.35 (d, 1H, J=3.5 Hz), 5.26 (dd, 1H, J=3.5 Hz, 11.5 Hz), 4.67 (d, 1H, J=8.5 Hz), 4.17 (dd, 1H, J=6.5 Hz, 11.5 Hz), 4.12 (dd, 1H, J=6.5 Hz, 11.5 Hz), 4.00 (dt, 1H, J=8.5 Hz, 11.5 Hz), 3.92 (m, 2H), 3.53 (m, 1H), 2.39 (m, 2H), 2.15 (s, 3H), 2.05 (s, 3H), 2.01 (s, 3H), 1.97 (s, 3H), 1.71 (m, 2H), 1.65 (m, 2H).

(5) A method for synthesizing a compound 7 as an intermediate product includes the following steps.

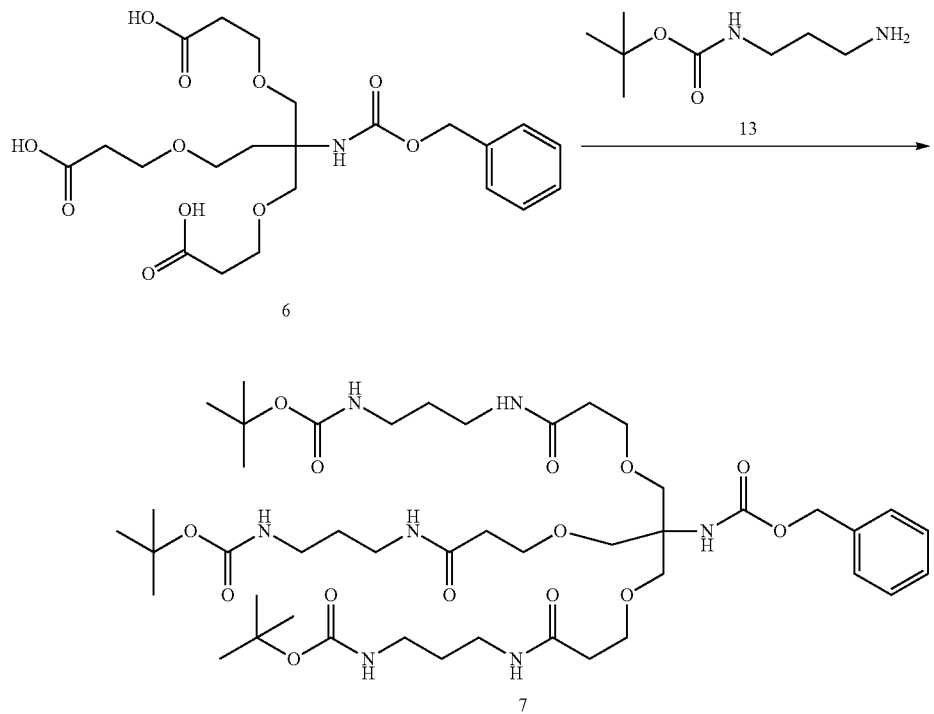

A compound 6 (3.613 g, 7.442 mmol), tetrahydrofuran (THF, 18 mL) and N-(tert-butoxycarbonyl)-1,3-diaminopropane (4.211 g, 24.17 mmol) are added into a reactor, a reaction solution is cooled to 0 DEG C., and hydroxybenzotriazole (HOBT, 3.511 g, 25.98 mmol) and benzotriazole-tetramethylurea hexafluorophosphate (HBTU, 8.712 g, 22.97 mmol) are added during stirring. Then, N,N-diisopropylethylamine (DIEA, 5.921 g, 45.81 mmol) is added dropwise, the reaction temperature is raised to the room temperature slowly, and a reaction solution is stirred contentiously overnight.

After the reaction, 40 mL of water is added into a reaction mixture firstly, followed by transferring into a separatory funnel containing 80 mL of ethyl acetate, and extraction and liquid separation are performed to separate an organic phase. The organic phase is washed with 20 mL of 10% $NaHCO_3$ aqueous solution, 20 mL of water, 40 mL of 10% citric acid solution, 20 mL of water, and 20 mL of salt solution in sequence, and dried with anhydrous sodium sulfate, and the solvent and volatile matters are removed in vacuo to obtain an oily liquid with faint yellow, that is, the compound 7 (mass: 6.944 g, yield: 94%).

Nuclear magnetic data characterization is as follows:

$^1$H NMR (400 MHz, $CDCl_3$): δ7.40-7.30 (m, 5H); 6.87 (m, 3H); 5.55 (s, 1H); 5.19 (t, J=5.8 Hz, 3H); 5.01 (s, 2H); 3.64 (s, 6H); 3.62 (t, J=6.0 Hz, 6H); 3.25 (m, 6H); 3.09 (m, 6H); 2.42 (t, J=6.0 Hz, 6H); 1.59 (m, 6H); 1.41 (s, 27H).

(6) A method for synthesizing a compound 8 as an intermediate product includes the following steps.

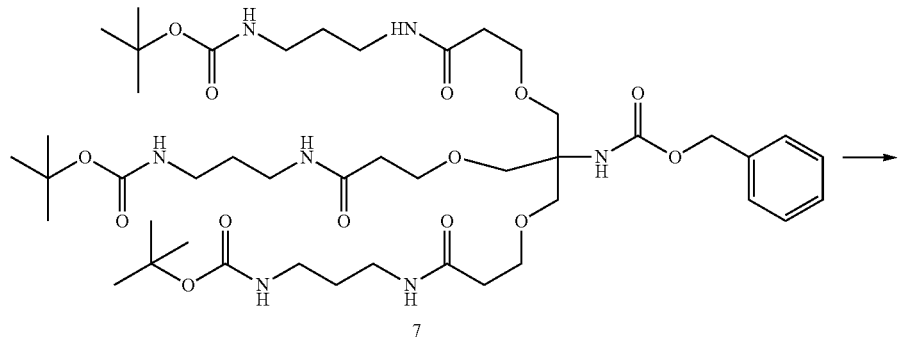

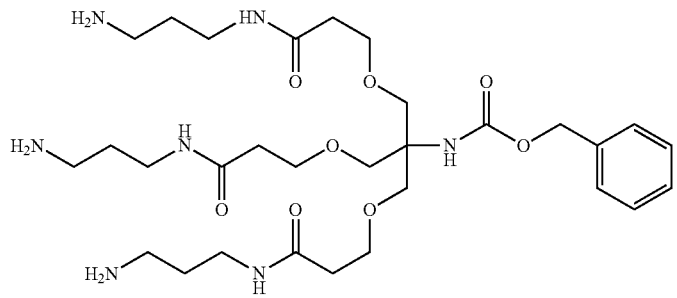

The compound 7 (6.031 g, 6.415 mmol) and 45 mL of trifluoroacetic acid are dissolved in 280 mL of DCM at the room temperature, and stirred for 30 minutes.

After the reaction, the reaction solution is diluted with methylbenzene (300 mL), evaporated under reduced pressure, and the two steps are repeated three times to obtain a pale red oily matter, that is, trifluoroacetates (mass: 6.207 g, yield: 99%) of the compound 8.

Nuclear magnetic data characterization is as follows: none.

(7) A method for synthesizing a compound 9 as an intermediate product includes the following steps.

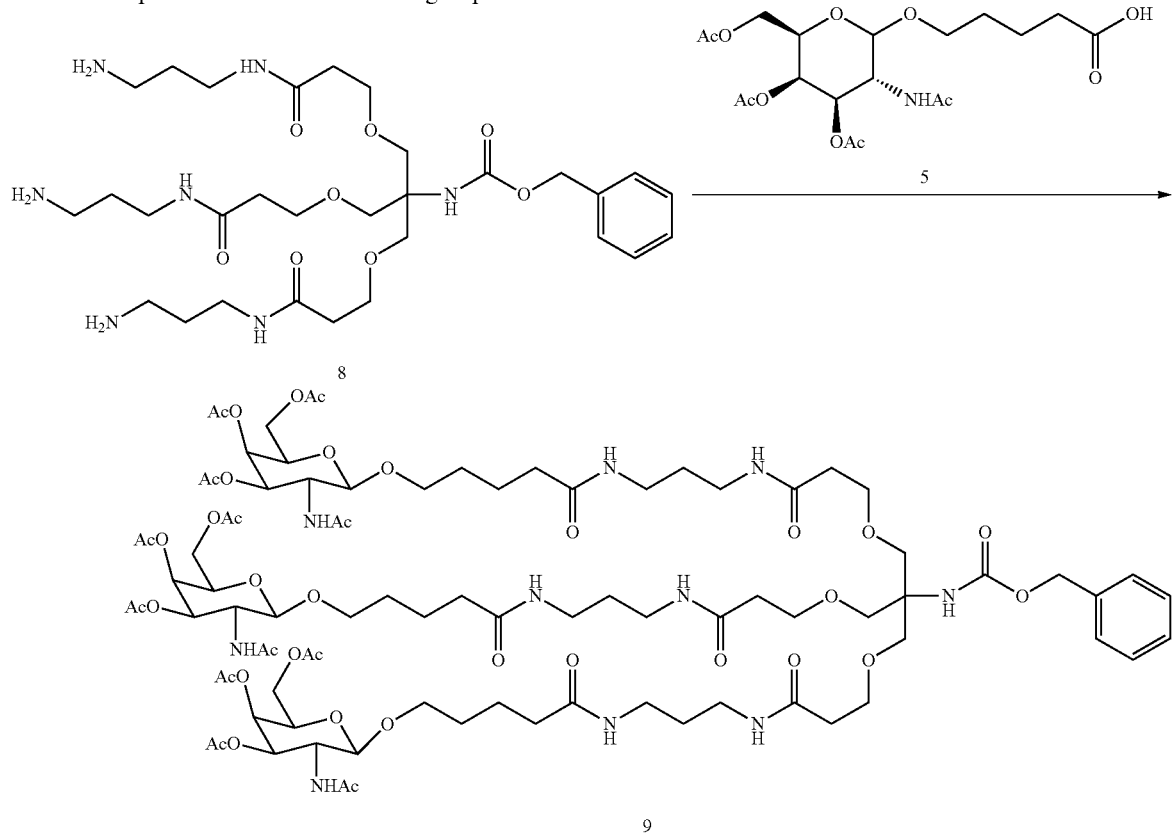

The trifluoroacetates (1.823 g, 1.86 mmol) of the compound 8 and the compound 5 (5.086 g, 11.34 mmol) are dissolved in 30 mL of acetonitrile, N-methylimidazole (NM, 2.876 g, 35.03 mmol), N,N,N',N'-tetramethylchlofmainiumhexafluophosphate (TCFH, 3.489 g, 12.43 mmol) are added in sequence, and stirring is performed overnight in a sealed condition at the room temperature. After the reaction, dichloromethane (30 mL) is added into the reaction solution, an organic phase is washed with saturated salt solution, followed by drying with anhydrous sodium sulfate, evaporated under reduced pressure, and the crude product is purified by the silica gel column chromatography, and dichloromethane and methanol are used as an eluent, thereby obtaining a white solid, that is, the compound 9 (mass: 2.943 g, yield: 81%).

Nuclear magnetic data characterization is as follows:

$^1$H NMR (400 MHz, DMSO-$d_6$): δ7.87-7.76 (m, 6H); 7.71 (t, J=5.7 Hz, 3H); 7.37-7.25 (m, 5H); 6.52 (brs, 1H); 5.20 (d, J=3.4 Hz); 5.00-4.92 (m, 5H); 4.47 (d, J=8.5 Hz, 3H); 4.06-3.97 (m, 9H); 3.86 (dt, J=8.8, 11.1 Hz, 3H); 3.69 (dt, J=5.6, 9.9 Hz, 3H); 3.53 (t, J=6.4 Hz, 6H); 3.47 (s, 6H); 3.39 (dt, J=6.4, 9.9 Hz, 3H); 3.07-2.97 (m, 12H); 2.26 (t, J=6.4 Hz, 6H); 2.09 (s, 9H); 2.03 (t, J=7.0 Hz, 6H); 1.98 (s, 9H); 1.88 (s, 9H); 1.76 (s, 9H); 1.58-1.35 (m, 18H).

(8) A method for synthesizing a compound 10 as an intermediate product includes the following steps.

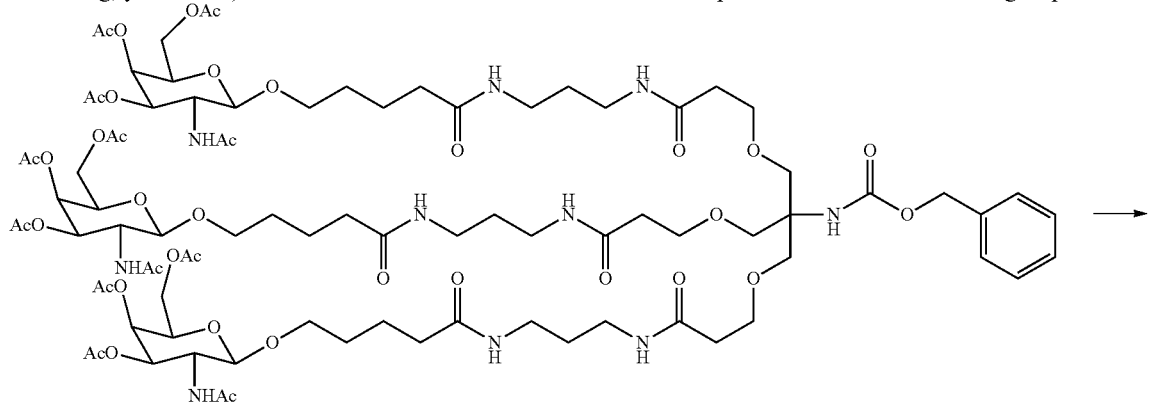

-continued

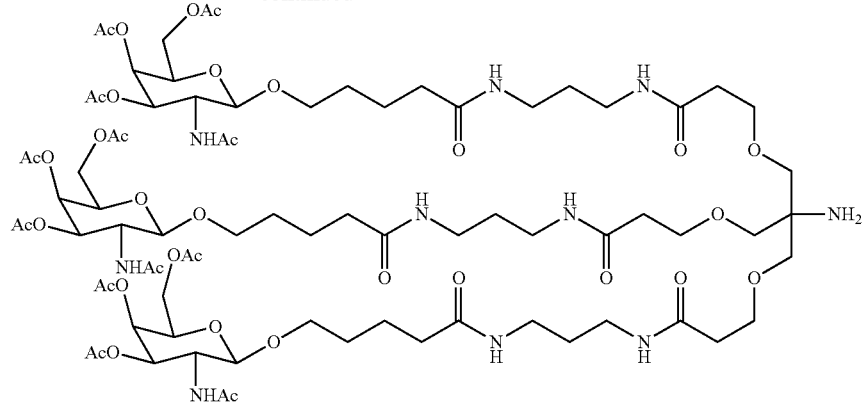

10

The compound 9 (1.012 g, mmol) is dissolved in 10 mL of methanol at the room temperature, and 0.1 g of 5% palladium-carbon is added into the reaction solution, followed by inflating and changing hydrogen gas three times and stirring for 4 h.

After the reaction, filtration is performed with diatomite, a filter cake is washed with a small amount of methanol, and the filtrate is concentrated in vacuo to obtain the compound 10 (mass: 1.012 g, yield: 99%).

Nuclear magnetic data characterization:

$^1$H NMR (400 MHz, DMSO-$d_6$): δ7.88 (t, J=5.5 Hz, 3H); 7.82 (d, J=9.2 Hz, 3H); 7.76 (t, J=5.6 Hz, 3H); 5.20 (d, J=3.4 Hz, 3H); 4.95 (dd, J=3.4, 11.2 Hz, 3H); 4.47 (d, J=8.5 Hz, 3H); 4.07-3.97 (m,9H); 3.86 (dt, J=8.9, 11.0 Hz, 3H); 3.69 (dt, J=5.9, 9.8 Hz, 3H); 3.63 (t, J=6.3 Hz, 6H); 3.48-3.34 (m, 9H); 3.03 (q, J=6.6 Hz, 12H); 2.33 (t, J=6.2 Hz, 6H); 2.09 (s, 9H); 2.03 (t, J=7.1 Hz, 6H); 1.99 (s, 9H); 1.89 (s, 9H); 1.76 (s, 9H); 1.56-1.38 (m,18H).

(9) A method for synthesizing a compound 11 as an intermediate product includes the following steps.

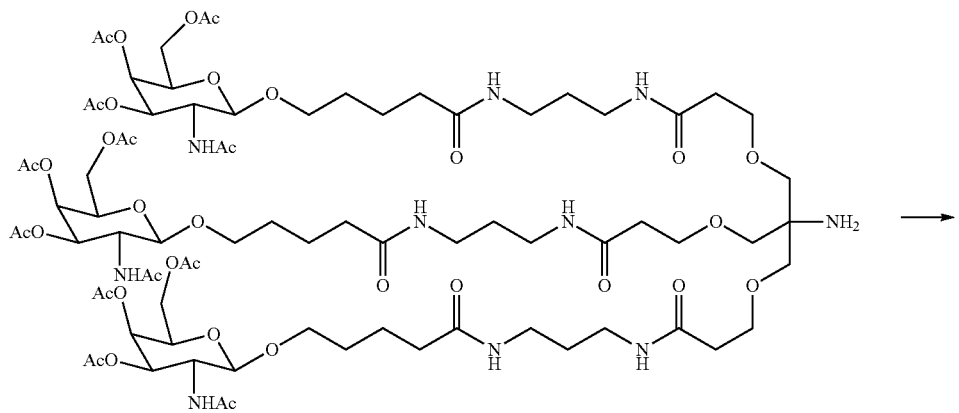

10

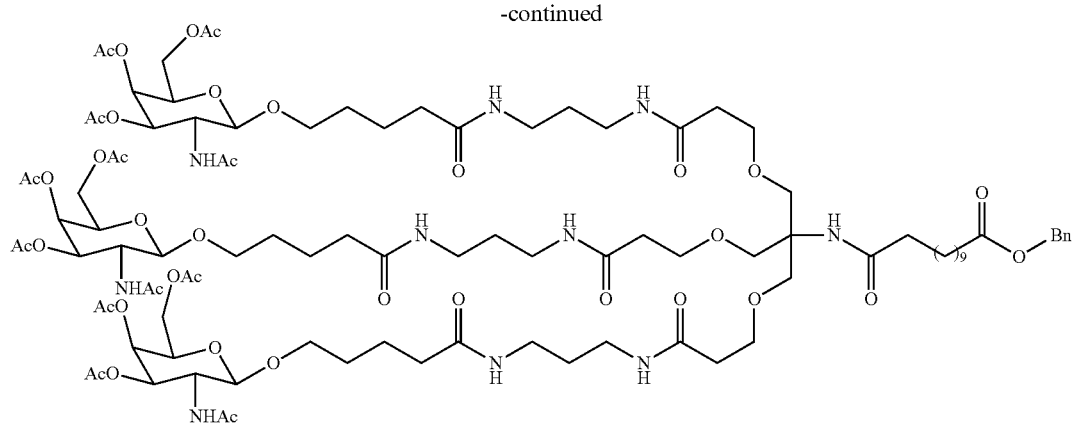

Monobenzyl dodecanoate (0.125 g, 0.393 mmol) is dissolved in 4 mL of diisopropylethylamine (DMF) at the room temperature, HBTU (0.164 g, 0.4324 mmol) and DIEA (0.2050 mL, 1.174 mmol) are added in sequence, and stirring is performed for a few minutes. Then, 2 mL of a DMF solution containing the compound 10 (0.751 g, 5.24 mmol) is added, and stirring is performed overnight.

After the reaction, the reaction solution is concentrated in vacuo, residues are dissolved in 20 mL of DCM, and the organic phase is washed with saturated $NaHCO_3$ solution and water in sequence, followed by drying with anhydrous $Na_2SO_4$, filtration, and concentrating in vacuo. Finally, silica gel column chromatography is performed (3-15% MeOH/DCM gradient elution), and concentration in vacuo is performed to obtain a white solid, that is, the compound 11 (mass: 0.608 g, yield: 75%).

Nuclear magnetic data characterization is as follows:

$^1$H NMR (400 MHz, DMSO-$d_6$): δ7.86-7.77 (m, 6H, NH); 7.72 (t, J=5.7 Hz, 3H); 7.39-7.28 (m, 5H); 6.97 (s, 1H); 5.20 (d, J=3.4 Hz, 3H); 5.07 (s, 2H); 4.95 (dd, J=3.4, 11.2 Hz, 3H); 4.47 (d, J=8.5 Hz, 3H); 4.07-3.96 (m, 9H); 3.86 (dt, J=8.9, 11.2 Hz); 3.69 (dt, J=5.9, 9.9 Hz, 3H); 3.60-3.45 (m, 12H); 3.39 (dt, J=6.3, 9.9 Hz, 3H); 3.08-2.95 (m, 12H); 2.32 (t, J=7.4 Hz, 2H); 2.26 (t, J=6.3 Hz, 6H); 2.09 (s, 9H), 2.03 (t, J=7.0 Hz, 8H); 1.98 (s, 9H); 1.88 (s, 9H); 1.76 (s, 9H); 1.56-1.36 (m, 22H); 1.28-1.14 (m, 12H).

(10) A method for synthesizing a compound 12 as an intermediate product includes the following steps.

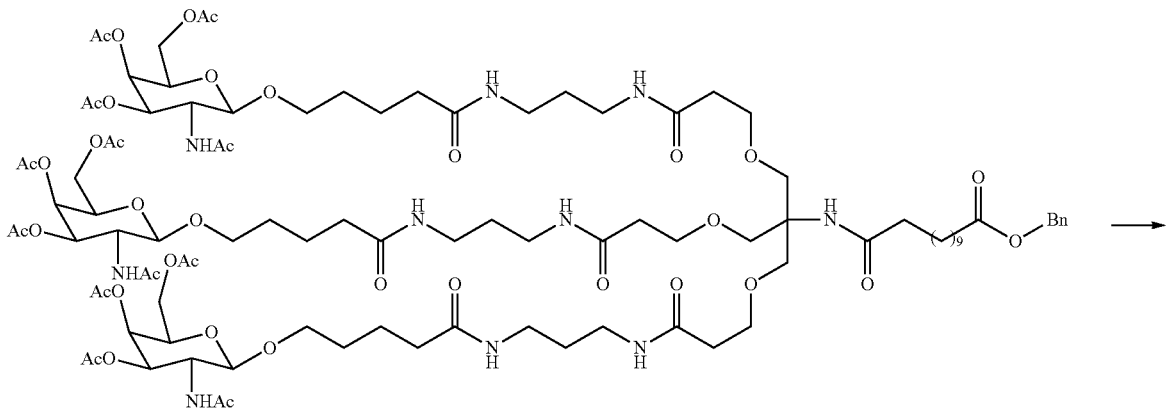

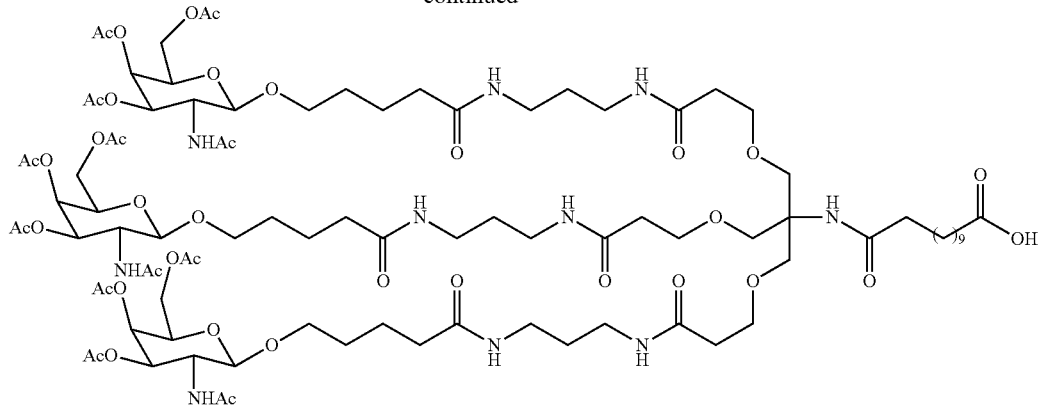

12

The compound 11 (1.000 g, 0.500 mmol), 10 mL of methanol and 5% of palladium-carbon (0.100 g) are added, followed by inflating and changing hydrogen gas three times, and stirring is performed overnight.

After the reaction, the reaction solution is filtered with diatomite, a filter cake is washed with a small amount of methanol, and the filtrate is concentrated in vacuo to obtain a white solid, that is, the compound 12 (mass: 0.960 g, yield: 96%).

Nuclear magnetic data characterization is as follows:

$^1$H NMR (400 MHz, DMSO-d$_6$): δ11.93 (brs, 1H); 7.91-7.81 (m, 6H); 7.72 (t, J=5.6 Hz, 3H); 6.96 (s, 1H); 5.20 (d, J=3.4, 3H); 4.96 (dd, J=3.4, 11.2 Hz, 3H); 4.48 (d, J=8.4; 3H); 4.05-3.97 (m, 9H); 3.86 (dt, J=8.8, 11.0 Hz, 3H); 3.69 (dt, J=6.0, 9.9 Hz, 3H); 3.57-3.47 (m, 12H); 3.40 (dt, J=6.3, 9.9 Hz, 3H); 3.07-2.98 (m,12H); 2.27 (t, J=6.4 Hz, 6H); 2.17 (t, J=7.4 Hz, 2H); 2.09 (s, 9H); 2.03 (t, J=7.2 Hz, 8H); 1.98(s, 9H); 1.89 (s, 9H); 1.76 (s, 9H); 1.55-1.37 (m, 22H); 1.27-1.16 (m, 12H).

(11) A method for synthesizing a compound 13 as an intermediate product includes the following steps.

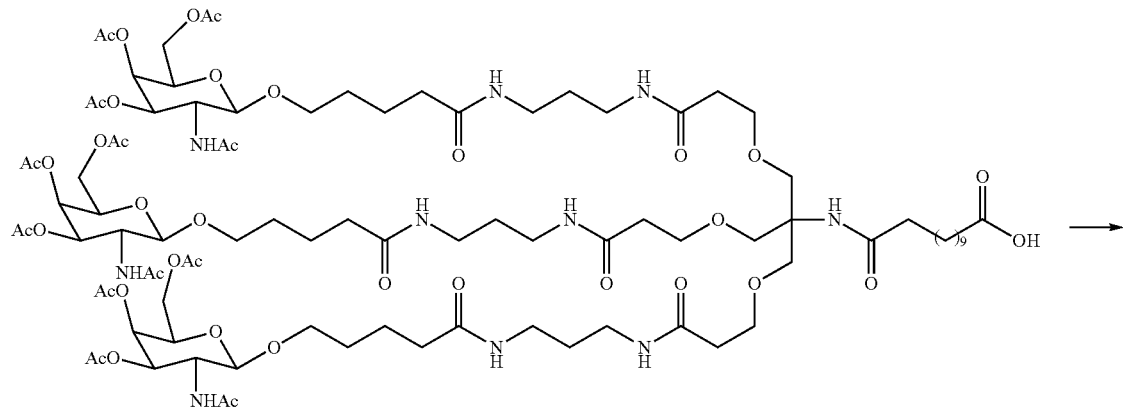

12

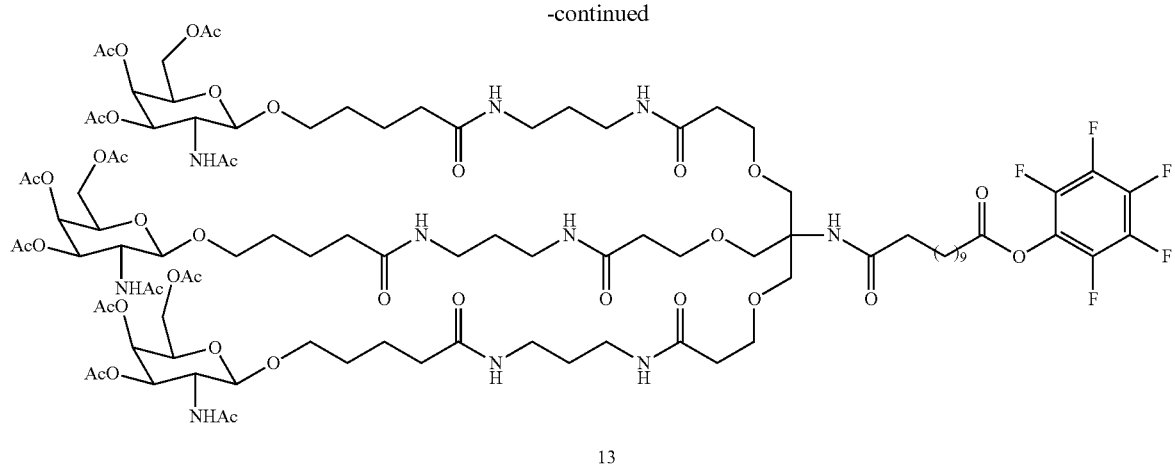

13

The compound 12 (0.631 g, 0.314 mmol), DMF (6.3 mL), and DMA (0.110 g, 0.795 mmol) are added into a reactor, and stirring is performed at 0 DEG C. 2,2,2-pentafluorophenyl trifluoroacetate (0.133 g, 0.477 mmol) is dropped into the reaction solution slowly, and after dropping, the temperature is raised to the room temperature, followed by stirring for 3 h.

After the reaction, the reaction solution is concentrated in vacuo; and then the silica gel column chromatography is performed to obtain a white solid, that is, the compound 13 (mass: 0.424 g; yield 62%).

Nuclear magnetic data characterization is as follows:

$^1$H NMR (400 MHz, DMSO-$d_6$): δ7.71-7.80 (m, 9H), 6.98 (s, 1H), 5.22 (d, J=3.3 Hz, 3H), 4.99 (dd, J=11.1 Hz, 3.3 Hz, 3H), 4.50 (d, J=8.4 Hz, 3H), 4.02 (s, 9H), 3.82-3.92 (m, 3H), 3.69-3.74 (m, 3H), 3.52-3.56 (m, 16H), 3.39-3.44 (m, 3H), 3.03 (s, 12H), 2.75-2.79 (m, 2H), 2.28 (t, J=6.3 Hz, 6H), 2.00-2.10 (m, 26H), 1.89 (s, 9H), 1.77 (s, 9H), 1.64-1.68 (m, 2H), 1.25-1.53 (m, 28H).

Example 2

Example 2 is basically the same as Example 1, and differs from Example 1 in that the method for synthesizing the compound 3 as an intermediate product includes:

adding the compound 2 (1.028 g, 2.64 mmol) and 1,2-dichloroethane (10 mL) into a reactor in sequence and stirring the mixture at a room temperature; then dropping TMSOTf (0.646 g, 2.90 mmol) into a reaction solution slowly; after the dropping, raising the temperature to 40 DEG C., and performing stirring; and TLC (DCM:MeOH=20:1) is performed to monitor the reaction. After the reaction, the reaction solution is concentrated in vacuo to obtain the compound 3 (mass: 0.842 g, yield: 97%).

Example 3

Example 3 is basically the same as Example 1, and differs from Example 1 in that the method for synthesizing the compound 3 as an intermediate product includes:

adding a compound 2 (10.225 g, 26.26 mmol) and 1,2-dichloroethane (100 mL) into a reactor in sequence and stirring the mixture at a room temperature; then dropping TMSOTf (6.421 g, 28.89 mmol) into a reaction solution slowly; after the dropping, raising the temperature to 65 DEG C. and performing stirring; and performing TLC (DCM:MeOH=20:1) to monitor the reaction. After the reaction, the reaction solution is concentrated in vacuo to obtain the compound 3 (mass: 8.216 g, yield: 95%).

While the present disclosure has been described in detail through the above preferred Examples, it should be recognized that the above description should not be considered as a limitation to the present disclosure. Various modifications and alternatives to the present disclosure will be apparent to those skilled in the art upon reading the foregoing. Accordingly, the scope of protection of the present disclosure should be defined by the attached claims.

What is claimed is:

1. A method for preparing an N-acetyl-D-galactosamine tripolymer precursor, and the method comprises:

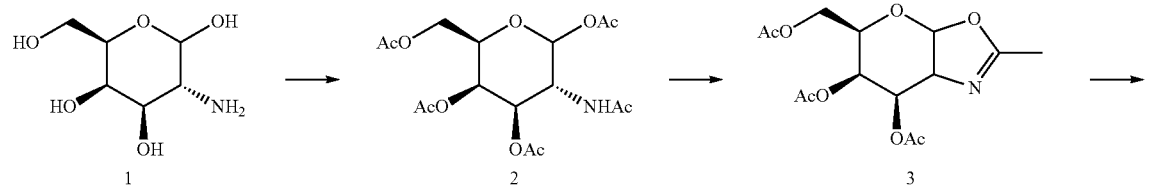

-continued
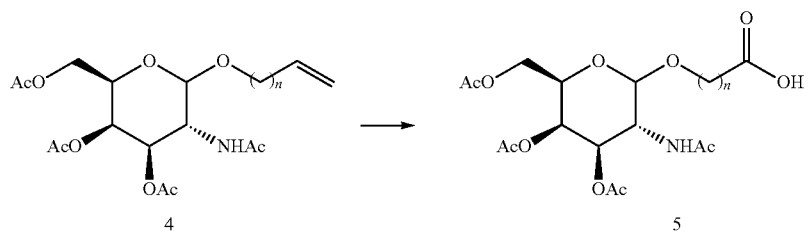
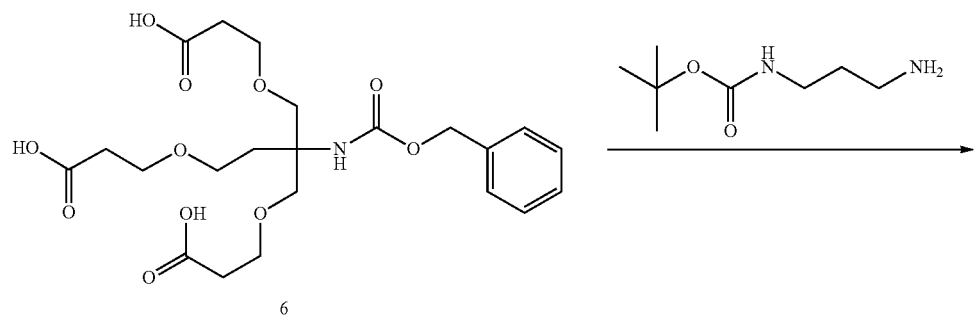
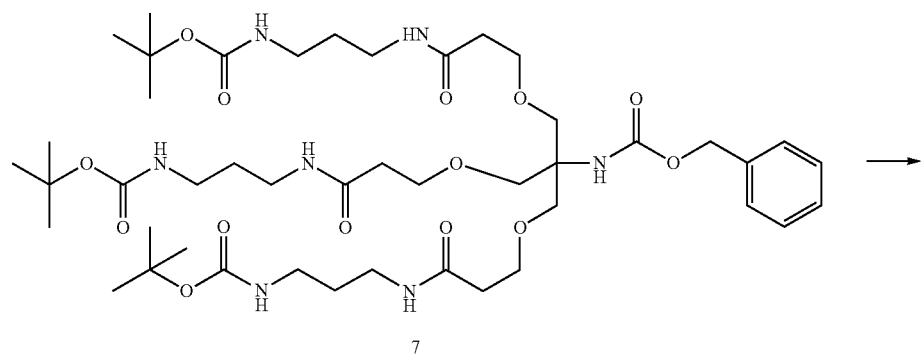
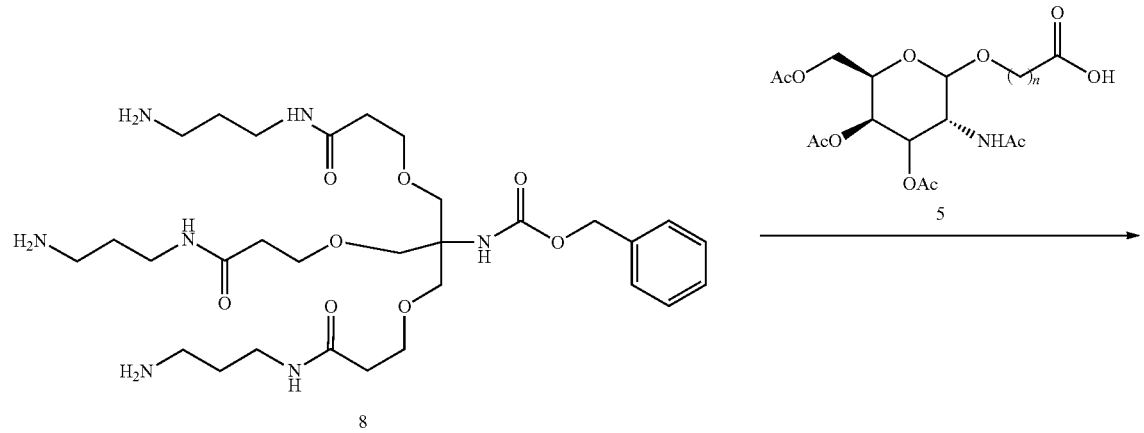

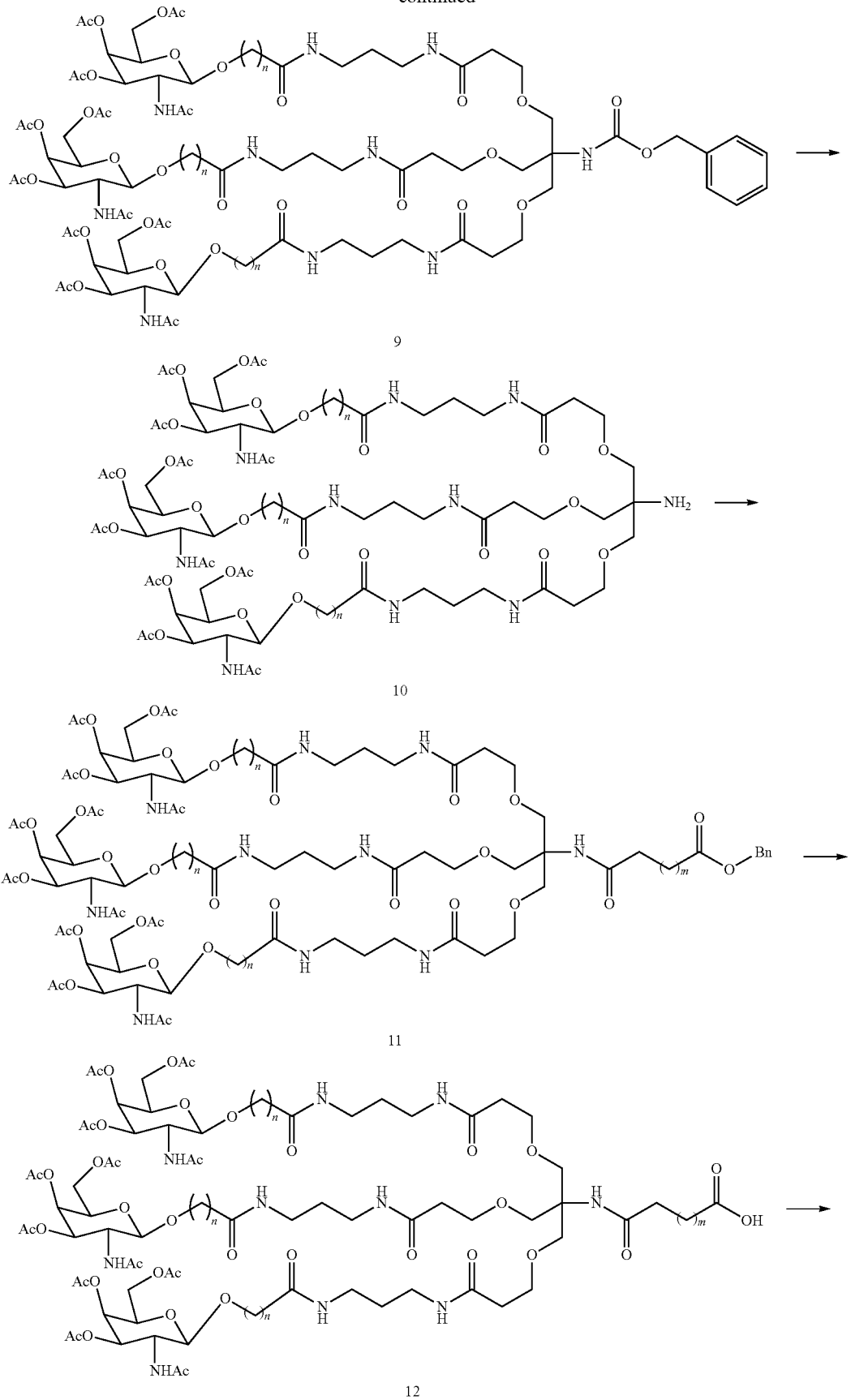

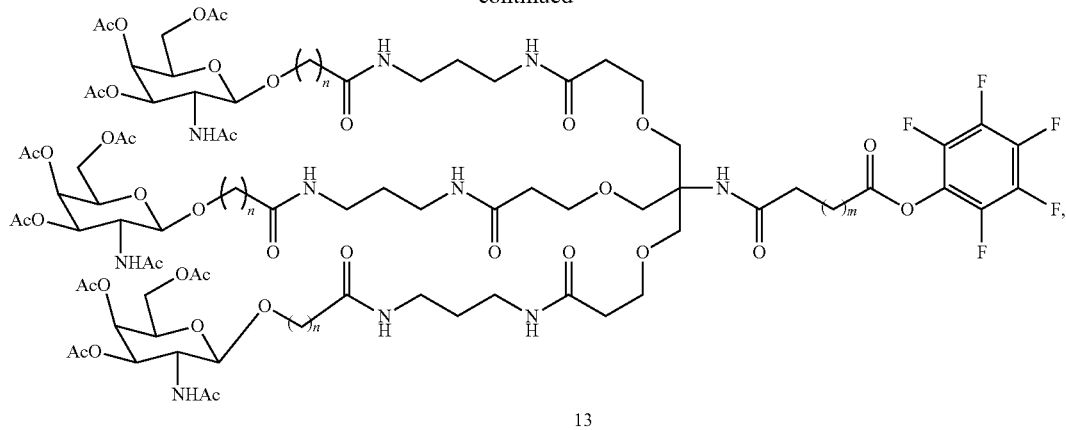

13 wherein n represents an integer ranging from 2 to 6, and m represents an integer ranging from 1 to 20, wherein a method for preparing a compound 4 comprises: adding a compound 3, a 4 Å molecular sieve powder, and a reaction solvent into a reactor at a room temperature; performing stirring at an inert gas atmosphere; firstly, adding an enol, followed by slowly dropping trimethylsilyl trifluoromethanesulfonate; after a reaction, quenching the reaction with an alkali solution; filtering to remove the 4 Å molecular sieve powder, washing the organic phase with saturated salt solution for three times, removing the solvent in vacuo; performing recrystallization with a non-polar organic solvent; and performing filtration with suction to obtain a filter cake, that is, the compound 4,

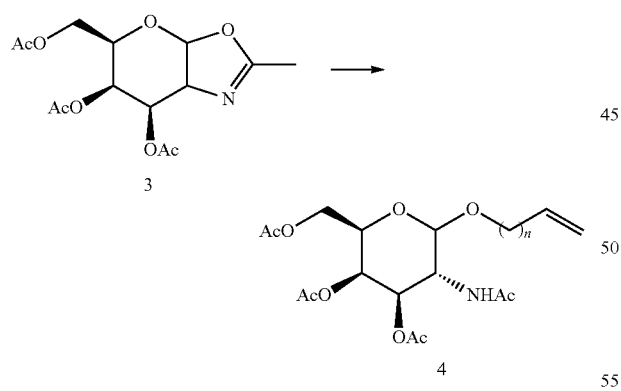

wherein the reaction solvent is selected from any one of dichloromethane, 1,2-dichloroethane, trichloromethane, and tetrachloromethane; the inert gas is selected from either nitrogen gas or argon gas; the alkali solution is selected from any one of sodium bicarbonate, sodium carbonate, potassium bicarbonate, potassium carbonate, sodium methoxide and sodium ethoxide; and the non-polar organic solvent is selected from any one or more of n-pentane, n-hexane, cyclohexane, cyclopentane, petroleum ether, heptane, and tetrahydrofuran, and wherein a method for preparing a compound 5 comprises: adding the compound 4 and the organic solvent into a reactor at the room temperature, followed by stirring; slowly adding a NaIO$_4$ solution, and followed by stirring; adding RuCl$_2$, followed by stirring; and evaporating under reduced pressure to obtain the compound 5:

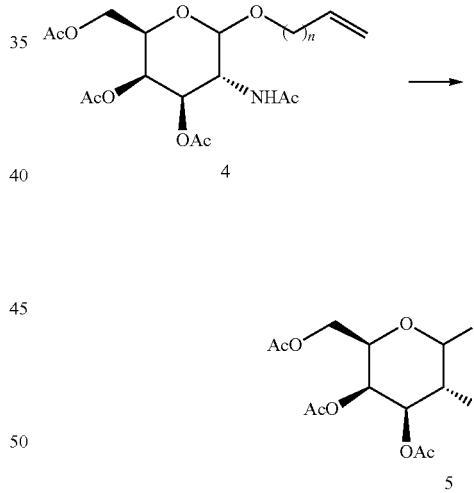

2. The method for preparing an N-acetyl-D-galactosamine tripolymer precursor according to claim 1, wherein a method for preparing a compound 11 comprises:
adding a monobenzyl alkanedioate into dimethylformamide at the room temperature; adding O-benzotriazole-tetramethyluronium hexafluophosphate and N,N-diisopropylethylamine in sequence, followed by stirring; adding a compound 10, followed by stirring; removing dimethylformamide in vacuo; dissolving a residue in dichloromethane; washing the organic phase; performing drying with sodium sulfate, followed by filtration and evaporating under reduced pressure; and purifying the crude product by silica gel column chromatography to obtain the compound 11:

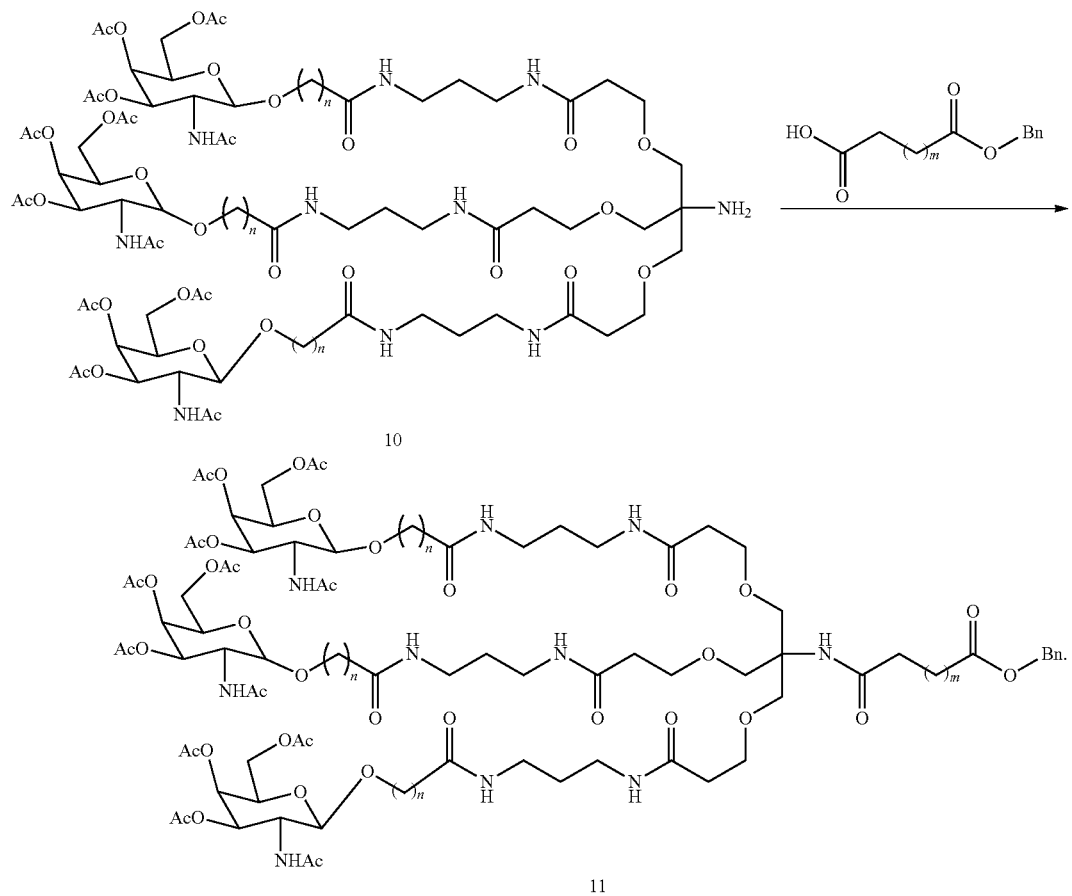

3. The method for preparing an N-acetyl-D-galactosamine tripolymer precursor according to claim 2, wherein n represents 4, and m represents 9.

4. The method for preparing an N-acetyl-D-galactosamine tripolymer precursor according to claim 1, wherein a method for preparing a compound 12 comprises:
dissolving the compound 11 in a reaction solvent at the room temperature; adding a palladium-carbon, followed by stirring in a hydrogen atmosphere; and performing post-treatment to obtain the compound 12, and

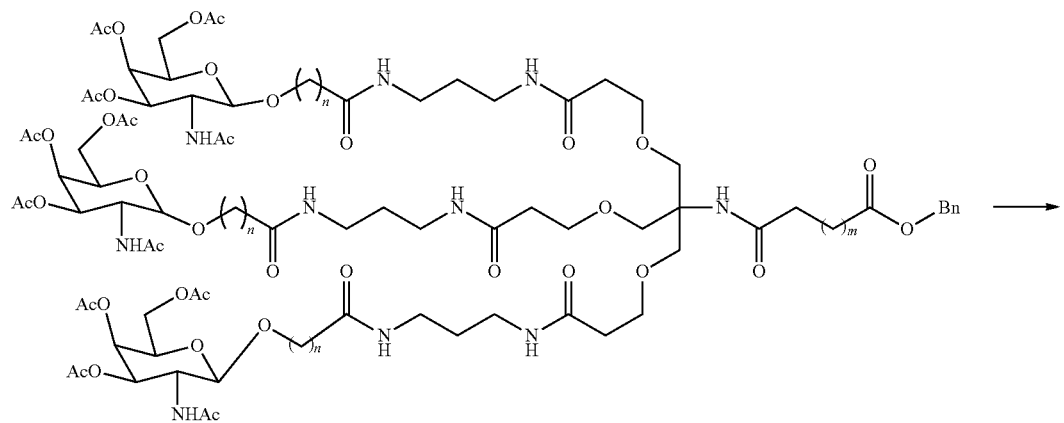

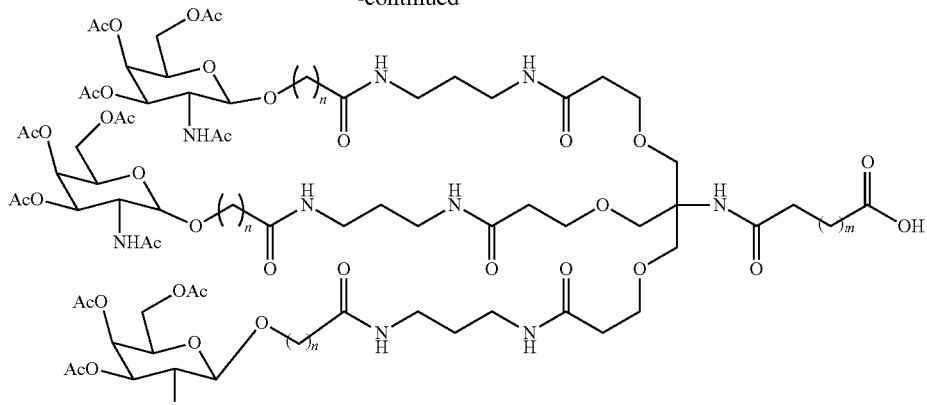

12 wherein the reaction solvent is methanol.

5. The method for preparing an N-acetyl-D-galactosamine tripolymer precursor according to claim 4, wherein n represents 4, and m represents 9.

6. The method for preparing an N-acetyl-D-galactosamine tripolymer precursor according to claim 4, wherein a method for preparing the compound 2 comprises:

adding a compound 1 into solvent at the room temperature, followed by stirring; adding an acetylating agent and a deacid reagent, followed by stirring; removing the solvent in vacuo; and then adding a recrystallization solvent, followed by filtration and drying, to obtain the compound 2, and

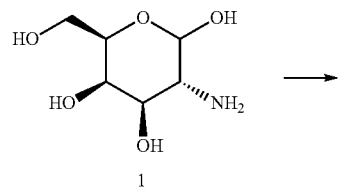

1

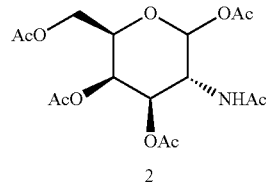

2 wherein the acetylating agent is acetic anhydride; the deacid reagent is selected from any one of sodium acetate, the triethylamine and isopropylamine; and the recrystallization solvent is selected from any one of a $C_1$-$C_{10}$ alcohol and a mixed liquor of various $C_1$-$C_{10}$ alcohols.

7. The method for preparing an N-acetyl-D-galactosamine tripolymer precursor according to claim 1, wherein n represents 4, and m represents 9.

8. The method for preparing an N-acetyl-D-galactosamine tripolymer precursor according to claim 1, wherein a method for preparing the compound 3 comprises:

adding and dissolving a compound 2 into a reaction solvent at the room temperature, followed by stirring; adding trimethylsilyl trifluoromethanesulfonate, followed by heating to 40-65 DEG C. and stirring; then quenching the reaction by adding an alkali; performing drying, filtration and evaporation on an extracted organic phase under reduced pressure to obtain the compound 3, and wherein the reaction solvent is selected from any one of dichloromethane, 1,2-dichloroethane, trichloromethane, and tetrachloromethane; and the alkali in the quenching the reaction by adding an alkali is selected from any one of diaminopropane, trimethylamine, triethylamine, tripropylamine, triisopropylamine, tributylamine, triisobutylamine, tri-sec-butylamine, tri-n-pentylamine, methoxyethylamine, and ethoxyethylamine;

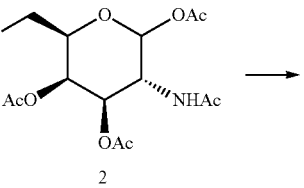

2

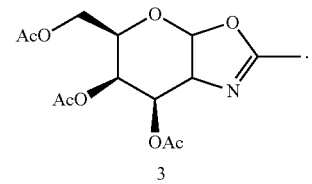

3

9. The method for preparing an N-acetyl-D-galactosamine tripolymer precursor according to claim 1, wherein a method for preparing a compound 9 comprises:

dissolving a compound 8 and a compound 5 in a reaction solvent at the room temperature, followed by stirring; adding N-methylimidazole and N,N,N',N'-tetramethylchlofmainiumhexafluophosphate, followed by stirring in a sealed condition; after the reaction, diluting the mixture with water, and extracting with dichloromethane for three times; washing the organic phase with saturated salt solution; performing drying with anhydrous sodium sulfate, filtration, and evaporating under reduced pressure; and purifying a crude product by the silica gel column chromatography to obtain the compound 9, and

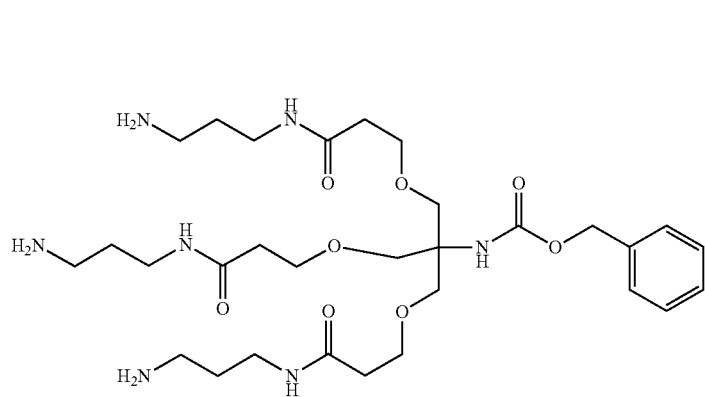
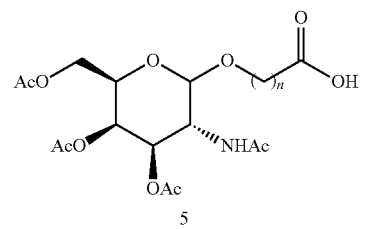

wherein n represents 4.

10. The method for preparing an N-acetyl-D-galactosamine tripolymer precursor according to claim 1, wherein a method for preparing a compound 7 comprises:
dissolving a compound 6 in a reaction solvent in an inert gas atmosphere at the room temperature followed by stirring; adding N-(tert-butyloxycarbonyl)-1,3-diaminopropane; reducing the reaction temperature to 0 DEG C.; adding 1-hydroxybenzotriazole and O-benzotriazole-tetramethylurea hexafluorophosphate during stirring, followed by adding N,N-diisopropylethylamine dropwise; slowly raising the reaction temperature to the room temperature and continuing to stir overnight; adding water, followed by extracting the mixture for three times with ethyl acetate; washing the combined organic phase with an inorganic alkali saturated solution, water, an acid aqueous solution, water and saturated salt solution in sequence; and performing drying with the anhydrous sodium sulfate, followed by filtration and evaporating under reduced pressure to obtain the compound 7, and

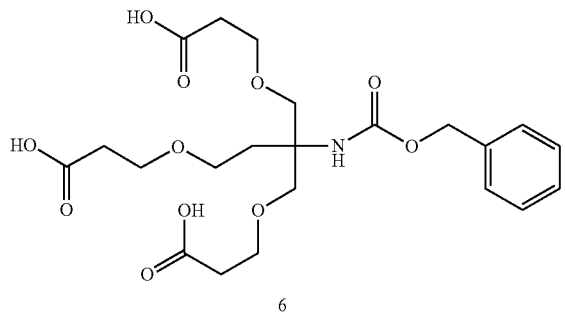
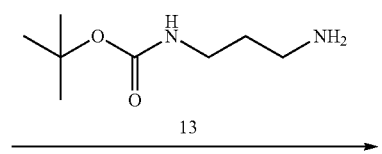

-continued

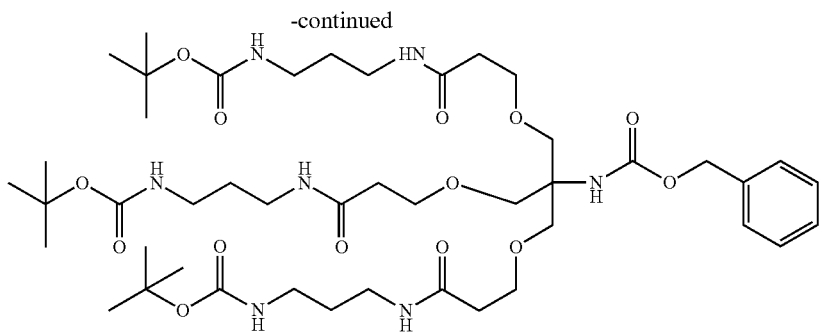

7 wherein the inert gas is selected from either nitrogen gas or argon gas; the reaction solvent is selected from any one or more of ethyl ether, diisopropyl ether, tetrahydrofuran, 1,4-dioxane, and 1,2-dimethoxy-ethane; and the inorganic alkali is selected from any one of sodium carbonate, potassium carbonate, sodium bicarbonate, trisodium phosphate, disodium hydrogen phosphate, potassium carbonate, potassium bicarbonate, tripotassium orthophosphate, and potassium hydrogen phosphate.

11. A preparation method of a compound 4 for preparing an N-acetyl-D-galactosamine tripolymer precursor, and the preparation method comprises:

adding a compound 3, a 4 Å molecular sieve powder, and a reaction solvent into a reactor at the room temperature; performing stirring at an inert gas atmosphere; firstly adding an enol, followed by slowly dropping trimethylsilyl trifluoromethanesulfonate; after a reaction, quenching the reaction with an alkali solution; filtering to remove 4 Å molecular sieve powder, washing the organic phase with saturated salt solution for three times; removing the solvent in vacuo; performing recrystallization with a non-polar organic solvent; and performing filtration with suction to obtain a filter cake, that is, the compound 4, and

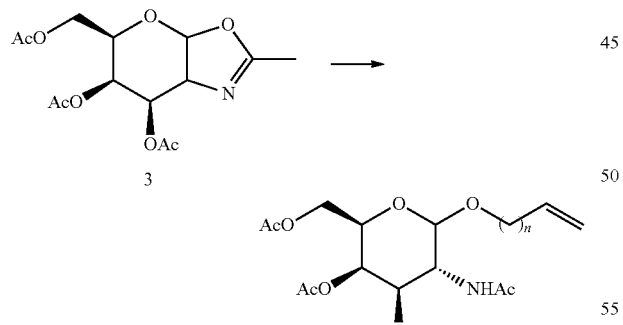

wherein n represents 4; the reaction solvent is selected from any one of dichloromethane, 1,2-dichloroethane, trichloromethane and tetrachloromethane; the inert gas is selected from either nitrogen gas or argon gas; the alkali solution is selected from any one of sodium bicarbonate, sodium carbonate, potassium bicarbonate, potassium carbonate, sodium methoxide, and sodium ethoxide; and the non-polar organic solvent is selected from any one or more of n-pentane, n-hexane, cyclohexane, cyclopentane, petroleum ether, heptane, and tetrahydrofuran.

12. A preparation method of a compound 5 for preparing an N-acetyl-D-galactosamine tripolymer precursor, and the preparation method comprises:

adding a compound 4 and an organic solvent into a reactor at the room temperature, followed by stirring; slowly adding a NaIO$_4$ solution, followed by stirring; adding RuCl$_2$, followed by stirring; and evaporating under reduced pressure to obtain the compound 5, and

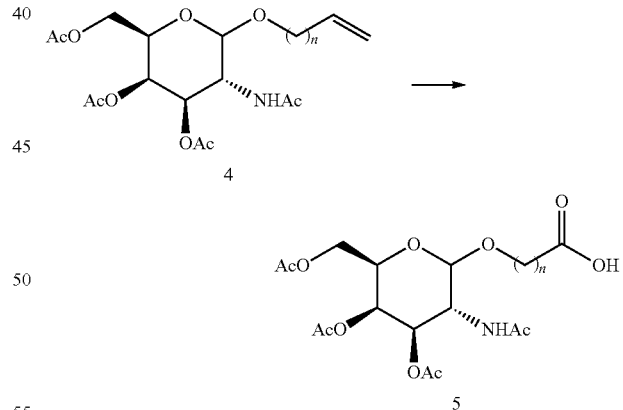

wherein n represents 4.

* * * * *